United States Patent
Soldo et al.

(10) Patent No.: US 9,027,127 B1
(45) Date of Patent: May 5, 2015

(54) METHODS FOR DETECTING MACHINE-GENERATED ATTACKS BASED ON THE IP ADDRESS SIZE

(71) Applicant: Google Inc., Mountain View, CA (US)

(72) Inventors: Fabio Soldo, Mountain View, CA (US); Ahmed Metwally, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 225 days.

(21) Appl. No.: 13/693,272

(22) Filed: Dec. 4, 2012

(51) Int. Cl.
*H04L 29/06* (2006.01)

(52) U.S. Cl.
CPC ............ *H04L 63/1425* (2013.01); *H04L 63/10* (2013.01)

(58) Field of Classification Search
CPC .............................. H04L 63/10; H04L 63/1425
USPC ...................... 726/22; 709/224, 229; 705/14.2
See application file for complete search history.

(56) References Cited

U.S. PATENT DOCUMENTS

| | | | |
|---|---|---|---|
| 7,584,287 B2 * | 9/2009 | Schneider et al. | 709/229 |
| 7,657,626 B1 * | 2/2010 | Zwicky | 709/224 |
| 2008/0059301 A1 * | 3/2008 | Granville | 705/14 |

OTHER PUBLICATIONS

Broido, A. et al.; "Spectroscopy of private DNS update sources"; Internet Applications. WIAPP 2003. Proceedings. The Third IEEE Workshop on DOI: 10.1109/WIAPP.2003.1210282; Publication Year: 2003 , pp. 19-29.*

Xiang Yang, et al.;"Low-Rate DDoS Attacks Detection and Traceback by Using New Information Metrics"; Information Forensics and Security, IEEE Transactions on vol. 6 , Issue: 2;DOI: 10.1109/TIFS.2011.2107320 ;Publication Year: 2011 , pp. 426-437.*
Interactive Advertising Bureau, Annual Report, http://www.iab.net/media/file/IAB-Ad-Revenue-Full-Year-2009.pdf. Apr. 2010.
The Kelsey Group, Annual Forecast, http://www.kelseygroup.com/press/pr080225.asp. Feb. 25, 2007.
N. Kshetri, "The economics of click fraud," *IEEE Security and Privacy*, 2010.
C. Mann, "How click fraud could swallow the Internet," *Wired Magazine*, 2006.
B. Grow, B. Elgin, and M. Herbst, "Click Fraud—The dark side of online advertising," *Business Week online*, vol. 10, No. 02, 2006.
A. Metwally and M. Paduano, "Estimating the Number of Users behind IP Addresses for Combating Abusive Traffic," *ACM SIGKDD 17th International Conference on Knowledge Discovery and Data Mining*, 2011.

(Continued)

*Primary Examiner* — Harunur Rashid
*Assistant Examiner* — Angela Holmes
(74) *Attorney, Agent, or Firm* — Leason Ellis LLP

(57) ABSTRACT

A system and method is disclosed for affecting action associated with machine-generated traffic. First historical information associated with Internet traffic to an Internet service at a first time is accessed and a first Internet Protocol Address ("IPA") size representing a first number of devices sharing at least one IP address that accessed the Internet service at the first time is determined. Second historical information associated with Internet traffic to the Internet service that occurred at a second time is accessed and a second IPA size is determined. An algorithm is applied that uses the first IPA size to estimate a third IPA size, representing a third number of devices sharing at least one IP address at the second time. A difference between the third and the second IPA sizes is computed, and evaluated to a threshold. An action is taken at a resource-provider system when the difference exceeds the threshold.

20 Claims, 18 Drawing Sheets

(56) References Cited

OTHER PUBLICATIONS

B. Taylor, "Sender reputation in a large webmail service," in *Third Conference on Email and Anti-Spam (CEAS)*, 2006.

"Exploits Block List." XBL—Exploit and Botnet Filter—The Spamhaus Project.1998. Web. <http://www.spamhaus.org/xbl/>.

R. Pike, S. Dorward, R. Griesemer, and S. Quinlan, "Interpreting the data: Parallel analysis with Sawzall," *Scientific Programming*, vol. 13, No. 4, pp. 277-298, 2005.

J. Dean and S. Ghemawat, "MapReduce: Simplified data processing on large clusters," *Communications of the ACM*, vol. 51, No. 1, pp. 107-113, 2008.

P. Sollich and A. Krogh, "Learning with ensembles: How overfitting can be useful," *Advances in neural information processing systems*, pp. 190-196, 1996.

J. Lin, "Divergence measures based on the shannon entropy," *IEEE Transactions on Information Theory*, vol. 37, No. 1, pp. 145-151, 1991.

K. Kira and L. Rendell, "The feature selection problem: Traditional methods and a new algorithm," in *Proceedings of the National Conference on Artificial Intelligence*. John Wiley & Sons Ltd, 1992, pp. 129-134.

J. Goodman, "Pay-per-percentage of impressions: an advertising method that is highly robust to fraud," in *Workshop on Sponsored Search Auctions*, 2005.

A. Juels, S. Stamm, and M. Jakobsson, "Combating click fraud via premium clicks," in *Proceedings of 16th USENIX Security Symposium*. USENIX Association, 2007, pp. 1-10.

A. Metwally, D. Agrawal, and A. El Abbadi, "Detectives: detecting coalition hit inflation attacks in advertising networks streams," in *Proceedings of the 16th international conference on World Wide Web*. ACM, 2007, pp. 241-250.

A. Metwally, F. Emekc,i, D. Agrawal, and A. El Abbadi, "SLEUTH: Single-publisher attack detection Using Correlation Hunting," *Proceedings of the VLDB Endowment*, vol. 1, No. 2, pp. 1217-1228, 2008.

N. Daswani and M. Stoppelman, "The anatomy of Clickbot. A," in *Proceedings of the first conference on First Workshop on Hot Topics in Understanding Botnets*. USENIX Association, 2007, p. 11.

V. Chandola, A. Banerjee, and V. Kumar, "Anomaly detection: A survey," *ACM Computing Surveys (CSUR)*, vol. 41, No. 3, pp. 1-58, 2009.

R. Becker, C. Volinsky, and A. Wilks, "Fraud Detection in Telecommunications: History and Lessons Learned," *Technometrics*, vol. 52, No. 1, pp. 20-33, 2010.

A. Kind, M. Stoecklin, and X. Dimitropoulos, "Histogram-based traffic anomaly detection," *IEEE Transactions on Network and Service Management*, vol. 6, No. 2, pp. 110-121, 2010.

Y. Xie, F. Yu, K. Achan, E. Gillum, M. Goldszmidt, and T. Wobber, "How dynamic are IP addresses?" *ACM SIGCOMM Computer Communication Review*, vol. 37, No. 4, pp. 301-312, 2007.

\* cited by examiner ated traffic. As used herein, the term "IPA size"

METHODS FOR DETECTING MACHINE-GENERATED ATTACKS BASED ON THE IP ADDRESS SIZE

BACKGROUND

Various forms of Internet services provided via a communication network, such as the Internet, may be made available by selectable links. Publishers of such services may be impacted negatively by link selections that are made automatically, such as by a computer program. As used herein, the term "Internet service" refers, generally, to content provided over the Internet. Internet services may include, for example, web sites, articles, music, video, graphics, information feeds, or other material. More generally, Internet services are among several types of resources that can be provided to a device connected to a distributed computer network such as the Internet. Also as used herein the term "publisher" refers, generally, to a provider of resources such as Internet services over a communication network, such as the Internet. For example a publisher may provide a general or specific content Internet web site that includes content (e.g., articles, discussion threads, music, video, graphics, information feeds, web sites, etc.), in response to one or more requests. In another example, a publisher may provide an on-line search service. In yet another example, a publisher provides a social network web site. The resources provided over the Internet can include first party content, generated, say, by the publisher of a website, and third-party content that is provided by others for inclusion in a webpage delivered to a device connected to a distributed computer network such as the Internet.

SUMMARY

This specification describes technologies relating to Internet traffic.

In an embodiment, a system and method is disclosed for affecting action associated with machine-generated traffic. The method includes accessing first historical information which is associated with Internet traffic to an Internet service that occurred at a first time. A first Internet Protocol Address ("IPA") size representing a first number of computing devices sharing at least one IP address that accessed the Internet service at the first time is determined. The method also includes accessing second historical information associated with Internet traffic to the Internet service that occurred at a second time. A second IPA size representing a second number of computing devices sharing at least one IP address that accessed the Internet service at the second time is determined. An algorithm is applied that uses the first IPA size to estimate a third IPA size, which represents a third number of computing devices sharing at least one IP address that accessed the Internet service at the second time. A difference between the third IPA size and the second IPA size is computed, and the difference is evaluated in comparison to a threshold that is indicative of machine-generated traffic. Thereafter, an action is taken at a resource-provider system when the difference exceeds the threshold.

The machine-generated traffic can represent attacks, such as botnet-based attacks and/or proxy-based attacks. Further, the determination of the difference between the expected second IPA size and the second IPA size can comprise measuring one or more anomalous deviations. The measuring the anomalous deviations optionally includes applying one or more of a vector-based method, a skewness-based method, an entropy-based method and a goodness-of-fit test.

The details of one or more implementations are set forth in the accompanying drawings and the description below. Other features and advantages will be apparent from the description and drawings, and from the claims.

BRIEF DESCRIPTION OF THE DRAWINGS

It should be noted that like reference symbols in the various drawings indicate like elements.

DESCRIPTION

Figure 1:
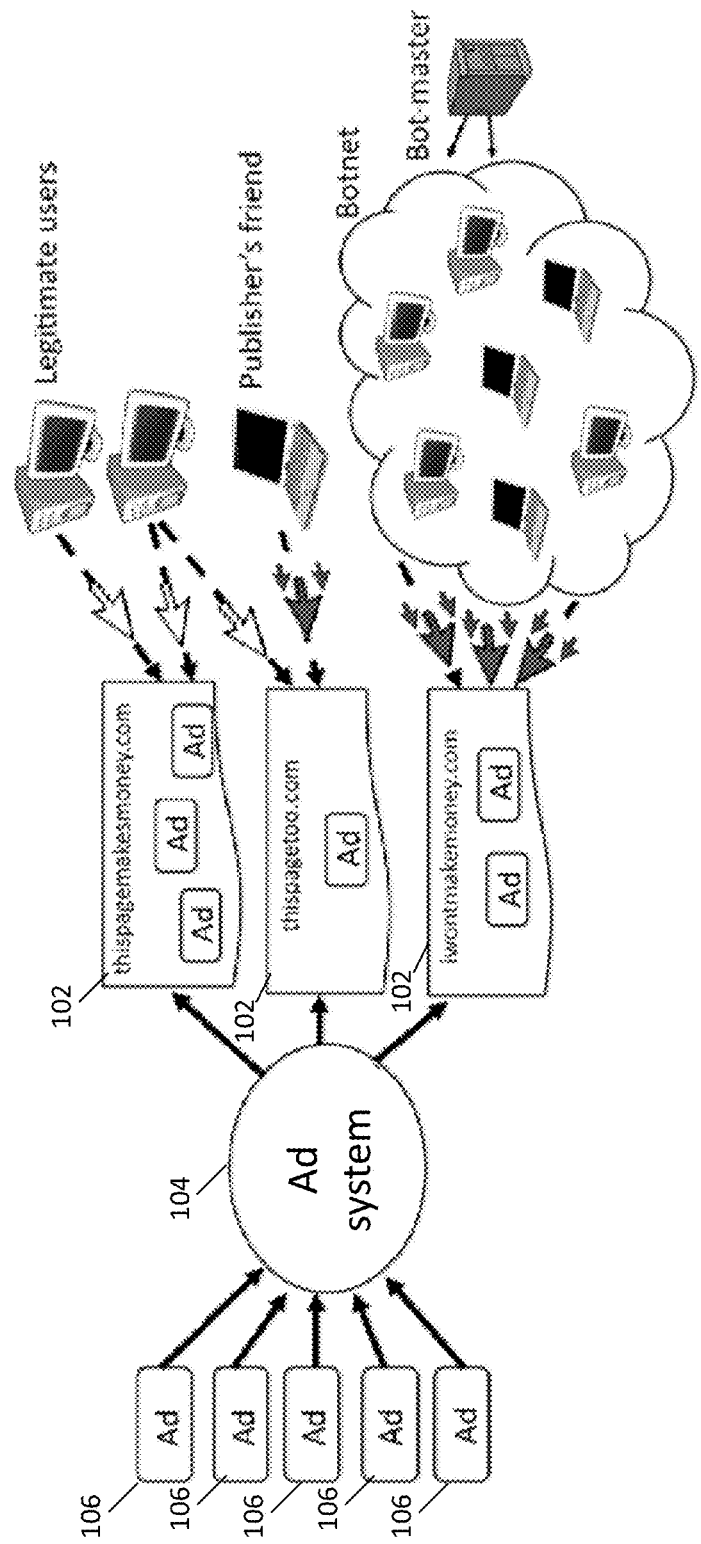
FIG. 1 is a block diagram that illustrates an example arrangement of hardware and traffic associated with three Internet publishers.

In accordance with one or more implementations, the present application regards a data-driven approach to combat machine-generated traffic based on Internet Protocol Address ("IPA") size information. As used herein, the term "IPA size" regards, generally, a number of computing devices sharing the same source IP address that accessed an Internet service at a given time or during a time period. It is recognized by the inventors that diverse machine-generated traffic attacks share a common characteristic: the traffic induces an anomalous deviation from an expected IPA size distribution. By recognizing the anomalous deviation, a fraud detection system and method are implemented to detect hit-inflation attacks at one or more levels of granularity and which may include the use of statistical learning models. More particularly, embodiments disclosed herein provide a principled framework that detects and classifies one or more deviations, substantially automatically, and applies statistical tests and/or ensemble learning. Accordingly, the system and method according to one or more embodiments are robust (e.g., to DHCP reassignment), are difficult to evade, have a low complexity and are easy to parallelize. The teachings herein provide a solution for large-scale click fraud detection that does not entail profiling users, or storing individual user information, but instead leverages only aggregate statistics representing network traffic and can be accurately estimated.

A large number of Internet services provided by publishers, such as related to web search, e-mail, geographic, mapping and other web-based applications, are provided to the public free of charge. Designing, deploying, and maintaining such services, however, incur significant expenses. Such services must have high availability, be able to serve any user who is anonymous or registered (and/or logged in), and be available from anywhere in the world.

Unfortunately, people engage in abusive and interfering click fraud, in which a person or a machine (via a software program) imitates a legitimate selection of third-party content (such as an information poll or a banner advertisement). In one example, software robots ("bots") automatically respond to an information poll, and in so doing distort the data being collected. In another example, the bots automatically select advertisements and paid-for links. Alternatively, a person selects advertisements, paid-for links or other third-party content, such as via a mouse, trackball, touchscreen, tablet computer or other suitable device. As used herein, a "click" represents a selection, such as of a hyperlink, and may refer to a selection made by a person, such as via a mouse, trackball, touchscreen, tablet computer or other suitable device. In addition and as used herein, a click may refer to an automatic selection, such as by a bot. One aim of click fraud is to distort true interest in a resource available through the Internet or other distributed computer network. A collateral effect can be to increase costs to advertisers and generate revenue to publishers, which generates charges for online advertisers without providing any real interest or return in the products advertised. Click fraud may be classified, among other things, into publishers' and advertisers' attacks. Publishers' attacks, such as "hit inflation attacks," use fraudulent traffic in an attempt to increase publishers' revenues from online advertising. Advertisers' hit inflation attacks aim at increasing the overall amount of activities, such as impressions or clicks associated with the advertisements of their competitors. The main objective of advertisers' hit inflation attacks is to deplete one or more competitors' advertising budgets.

Hit inflation attacks can be performed in many ways, and may use different network infrastructures and levels of sophistication. FIG. 1 depicts an example scenario that includes three publishers, and each publisher receives one or more respective types of traffic. In the example shown in FIG. 1, three publishers 102 contract with an advertising system 104 to host advertisements 106 for a commission associated with each click on the advertisements. The three publishers 102 shown in FIG. 1 receive three types of traffic: (1) advertisements on the publisher site, thispagemakesmoney.com, are clicked only by legitimate users (white pointers); (2) advertisements on the publisher's site, thispagetoo.com, are clicked by both legitimate and fraudulent users (gray pointers); and (3) advertisements on the publisher's site, iwontmakemoney.com, are not clicked by legitimate users. Advertisements 106 on the respective publisher 102 sites "thispagemakesmoney.com" and "thispagetoo.com" receive legitimate traffic, i.e., users who clicked on links were truly interested in the advertisements 106. Advertisements 106 on "thispagetoo.com" also receive fraudulent traffic. For instance, the publisher of "thispagetoo.com" may have asked her friends to repeatedly click on advertisements displayed on her site. A more sophisticated hit inflation attack is illustrated in connection with the publisher associated with "iwontmakemoney.com," and includes a botnet to automatically generate a large amount of fraudulent traffic. The examples shown in FIG. 1 illustrate the complexity of the click fraud problem.

There is a concern that click fraud may distort the information being gathered from devices concerning interest in a given resource, and this can undermine confidence in the resource-providing systems that provide third-party content to websites and for other use by content publishers. Accordingly, fraud detection is an important component for the well-being of many Internet services.

Figure 2:
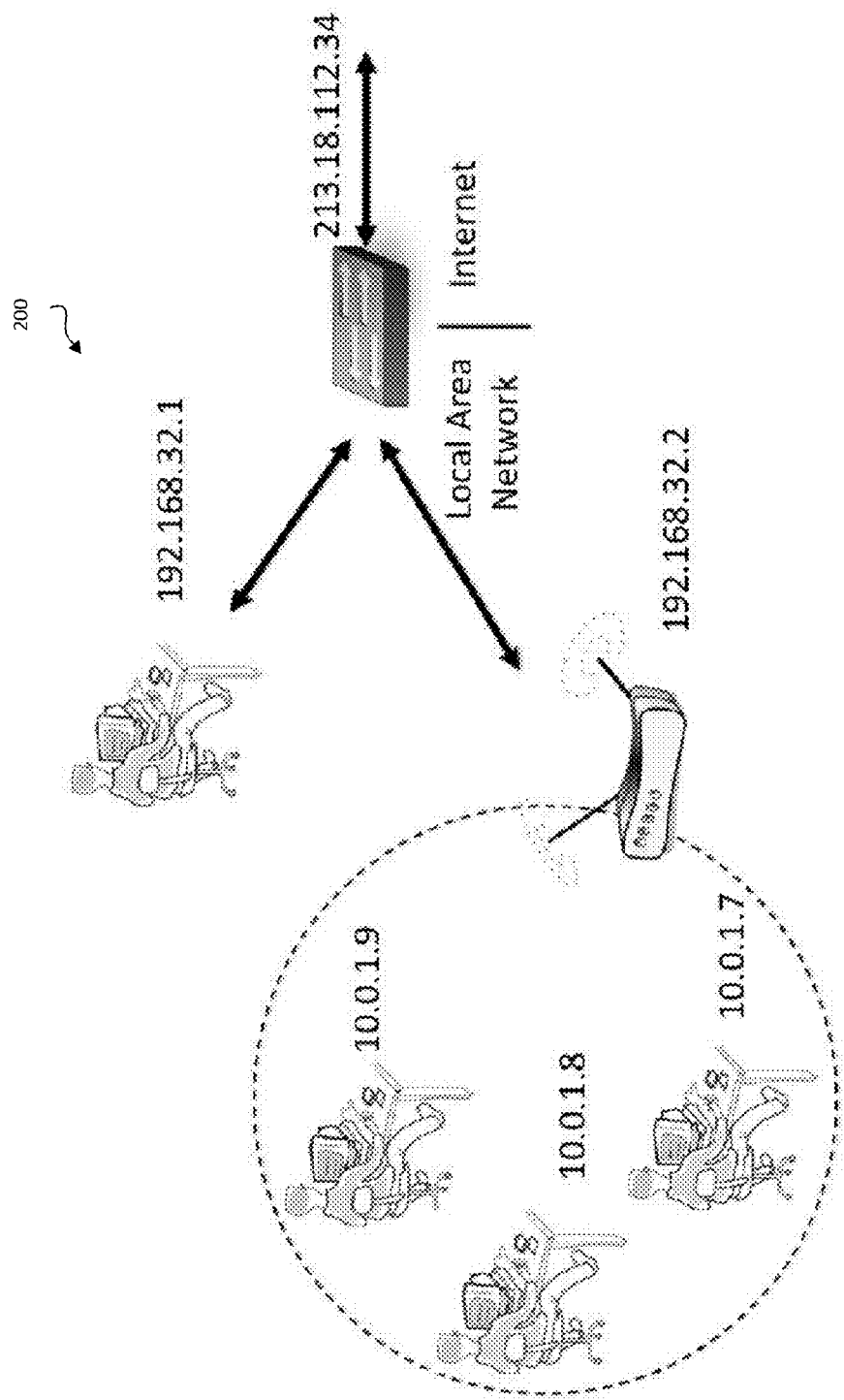
FIG. 2 is a diagram of a plurality of computing devices, some of which share a single IP address.

As noted above, the term IPA size refers to the number of computing devices sharing the same IP address that accessed an Internet service at a given time or during a time period. Estimating an IPA size can be challenging. Several user computing devices may share the same host machine, or may connect through the same Network Address Translation (NAT) device or even a cascade of NAT devices. An example arrangement representing this is illustrated in FIG. 2. The arrangement 200 illustrated in FIG. 2 includes IP address 213.18.112.34, which is shared by four users and, thus, the IPA size of 213.18.112.34 is 4. In this simple example, the specific IP address (213.18.112.34) is expected to generate roughly four times the amount of activity that would otherwise be generated by a single user.

As new user computing devices join a local network and share the same public IP address and others leave, or as an IP address gets reassigned to a different host, the IPA size changes over time. Embodiments disclosed herein use data to build a probabilistic model of user activities. Then, the IPA size is estimated as a function of both the rate of activities observed and the diversity of the observed traffic.

IPA Size Distributions

Figure 3:
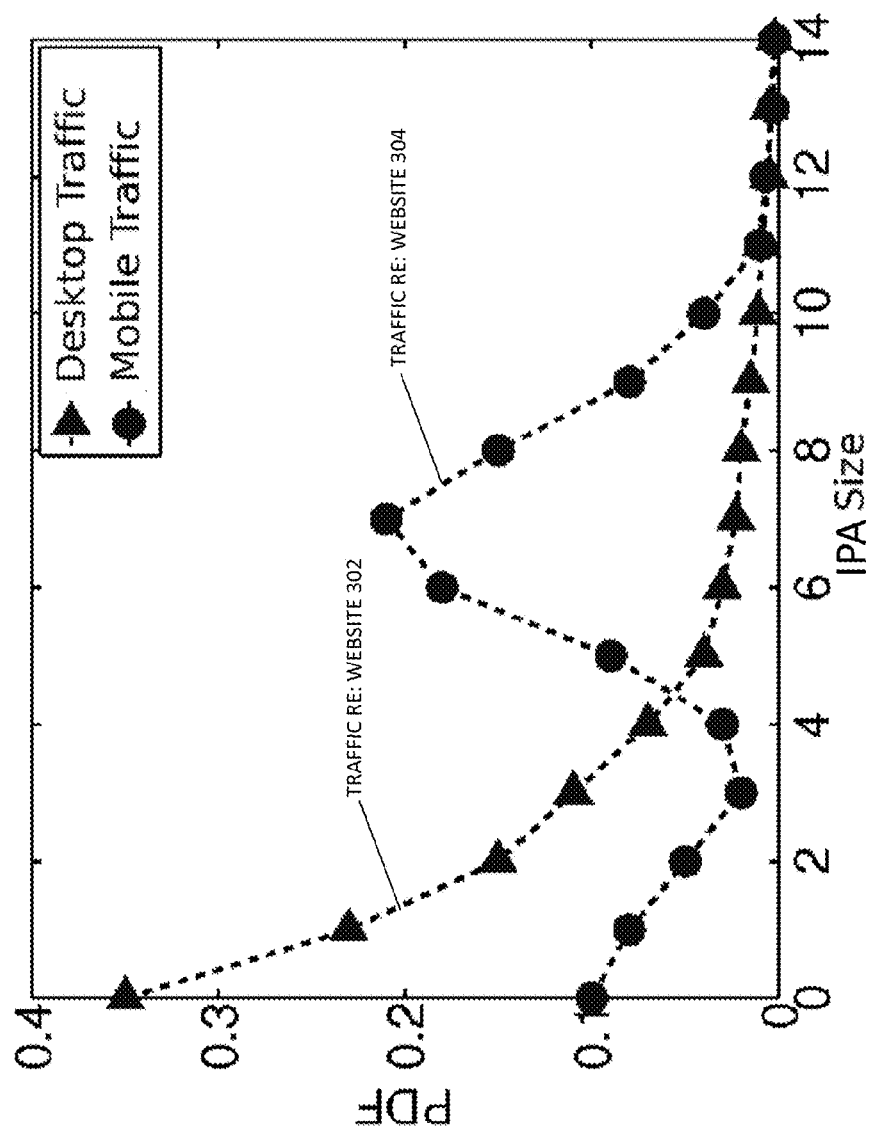
FIG. 3 is a graph illustrating two examples of IPA size distributions for two respective websites.

In accordance with an implementation and for each respective publisher and at a given time period, T, an IPA size distribution is measured that represents an empirical distribution of IPA sizes associated with third-party resources included on a publisher's website during the time period T. Different publishers may exhibit different IPA size distributions. FIG. 3 is a graph illustrating two examples of IPA size distributions for two respective websites. A first website 302, on average, receives traffic associated with desktop and/or laptop computers, and a second website 304, on average, receives traffic associated with mobile computing devices. For website 302, most of the clicks are characterized with small IPA sizes because, typically, only a handful of the computing devices share the same IP address. As such, the IPA size distribution is highly skewed toward the left. Alternatively and in connection with website 304, the IPA size distribution exhibits two distinct modes. This is because mobile computing devices typically access the Internet either with public IP addresses, which have relatively small sizes, or through large proxies, which are shared by numerous users. Accordingly and as represented in FIG. 3, different publishers may have different IPA size distributions, depending on the type of services they provide and the type of traffic driven to their websites.

Machine-generated attacks may be performed in various ways depending on, for example, the available resources, motivations and skills of the attackers. For instance, if an attacker controls a large number of hosts through a botnet, the attack can be highly distributed across the available hosts to maximize the overall amount of traffic generated while maintaining a low activity profile for each host individually. This type of attack is referred to herein, generally, as a botnet-based attack. Conversely, if an attacker controls one or just a few hosts but still wants to generate a large amount of traffic, that attacker may use anonymizing proxies, such as TOR nodes, to hide the actual source Internet Protocol address(es) involved. This type of attack is referred to herein, generally, as a proxy-based attack. Botnet-based and proxy-based attacks are two diverse examples in a wide spectrum of possible attacks using machine-generated traffic, both in terms of resources required and level of sophistication.

Figure 4A:
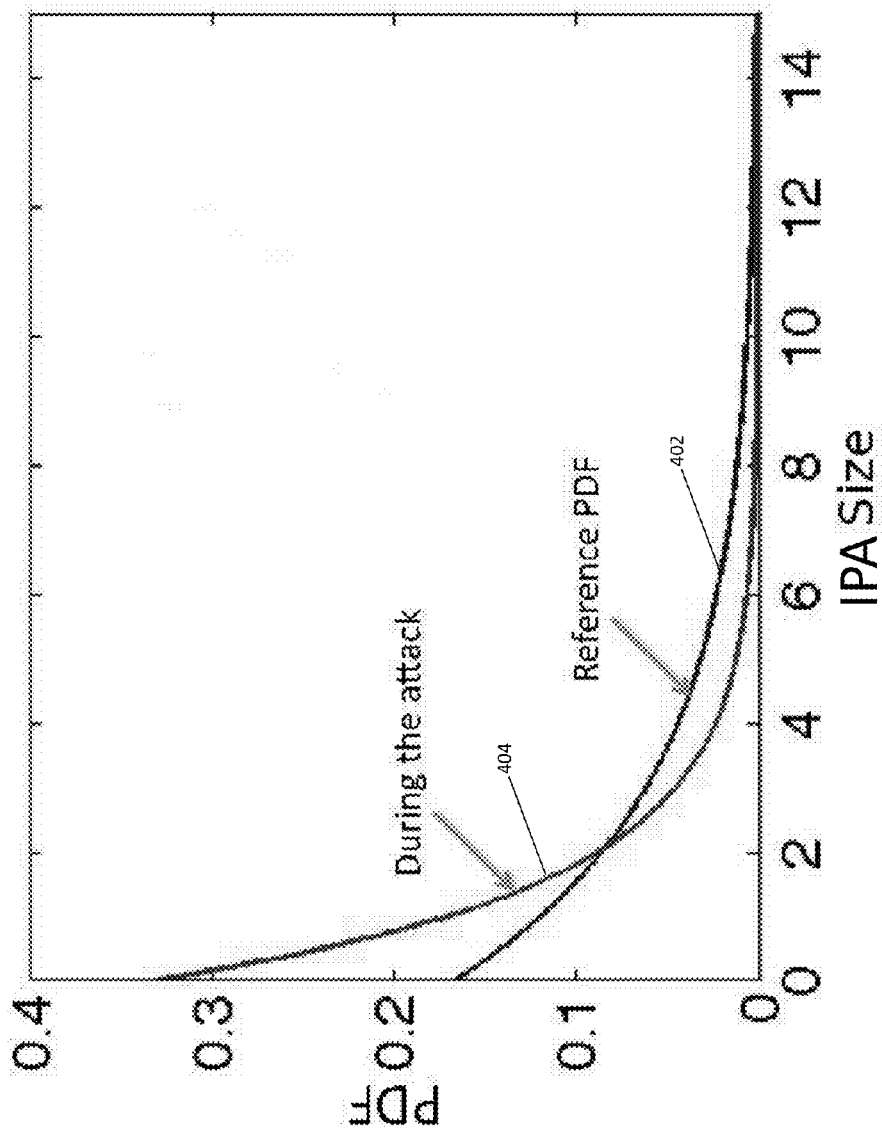
FIGS. 4A and 4B are graphs respectively illustrating botnet-based and proxy-based attacks.
Figure 4B:
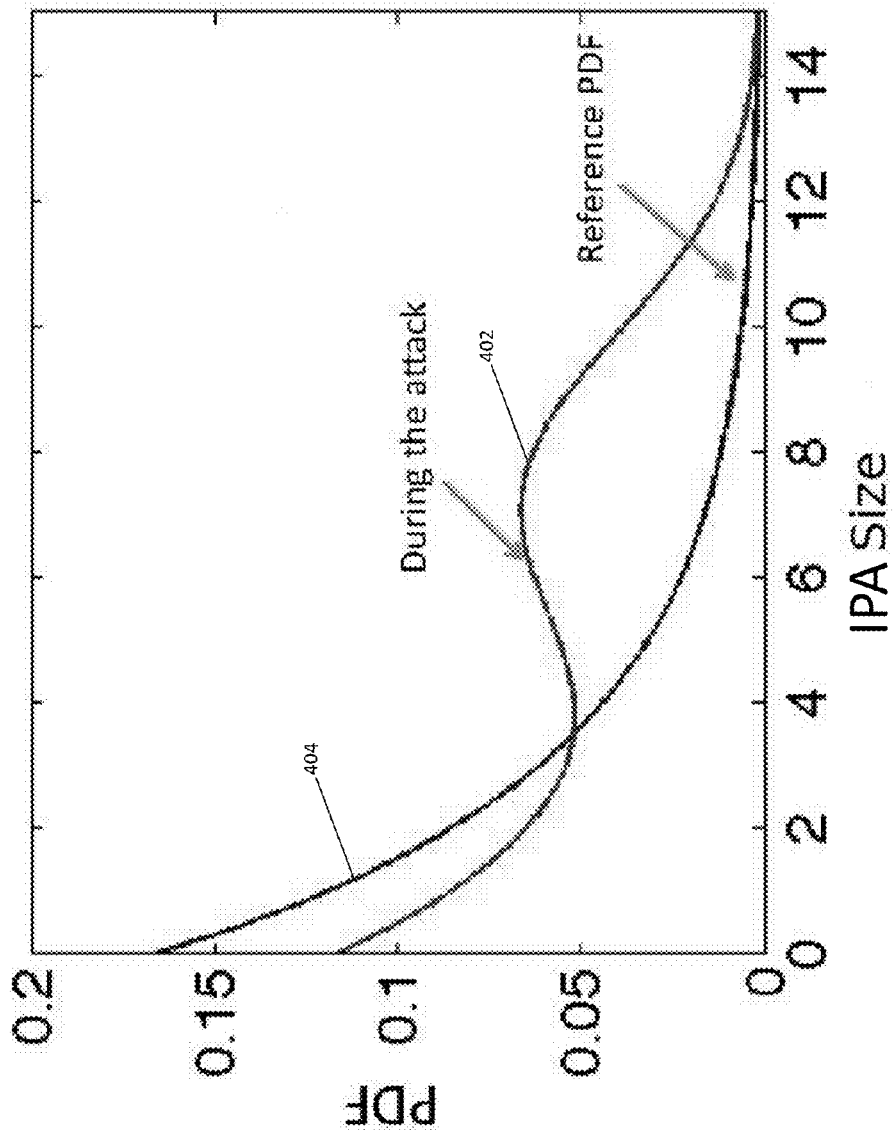

FIGS. 4A and 4B are graphs respectively illustrating botnet-based and proxy-based attacks and how they affect the IPA size distribution associated with a publisher. In the examples shown in FIGS. 4A and 4B, an a-priori knowledge of the expected IPA size distribution is obtained, for example, based on historical data. Curve 402 represents the expected distribution of IPA sizes associated with the publisher and curve 404 represents the IPA size distribution during the attack.

The graph shown in FIG. 4A depicts an example of a botnet-based attack. Bots typically execute on end-user machines, often because end-user machines are easier to compromise than large well-maintained proxies. As such, bots typically are associated with a relative small IPA size and, as a result, a botnet-based attack generates a higher than expected number of clicks and a small IPA size.

The graph shown in FIG. 4B depicts an example proxy-based attack: the IP addresses generating the clicks are rerouted through anonymizing proxies (e.g., TOR nodes). Since many users share these proxies, this attack skews the IPA size distribution toward large IPA sizes, Accordingly, a higher than expected number of clicks originates from large proxies.

Despite differences between botnet-based and proxy-based attacks, most attacks share a common characteristic: they induce an unexpected deviation of the IPA size distribution. In general, different deviations represent different signatures of attacks.

Data Set

In an implementation, historical information in the form of data logs is referenced from publishers, such as data representing clicks received by the publishers, to determine a sample of publisher websites. Logs may be used to gain insight into machine-generated traffic attacks, as well as to test and evaluate the performance of one or more implementations. In an embodiment, a sample of click logs is collected for a period of time, such as 90 consecutive days. Example data elements may include: source IP, which represents the source IP address that generates a click; publisher ID, which represents the unique identifier associated with a publisher; and time, which represents a timestamp associated with the click. In some cases, logs may contain information representing that a click was fraudulent and a data element, fraudulent click flag, may be included which represents a binary flag indicating whether or not the click was labeled as fraudulent. The click logs may include information from previous determinations of fraudulent traffic made in connection with the teachings herein.

In addition to click logs, other information may be referenced, such as: IPA size history information estimated from the click traffic to filter fraudulent clicks; and current geographical information, which represents geographic locations of source IP addresses.

Assessing the Quality of Traffic

In an implementation, an internal classifier may be defined that takes as input click logs of network traffic and determines the likelihood that the network traffic is fraudulent machine-generated traffic. The likelihood of fraudulent machine-generated traffic may be represented, generally, herein as a "quality score." A variety of features that account for different types of user inputs, and different types of anomalies may be used as input and the classifier provides an estimate on the aggregate quality of a large set of clicks. Similar classifiers may be provided for other kinds of attacks depending on a particular implementation. For instance and in the case of email spam, a classifier may be built on several features of the email. One of the features may be a ratio of users that labeled a particular email message as spam. Another feature may be the number of valid and invalid recipient addresses. Other suitable features may be used, as well.

In addition to the quality score, a "fraud score" is defined as a function of the ratio between the number of fraudulent clicks and the total number of clicks, with different weights assigned to the fraudulent clicks depending on the reason for tagging them as fraudulent. In addition, a plurality of blacklists may be defined to determine whether or not the respective IP addresses that generate fraudulent advertisement events are also known to generate other types of abusive traffic. For example, an IP address may represent a source computing device responsible for click fraud as well as a source of e-mail spam.

In an implementation, each click, c, is associated with a source IP address, $IP_c$, that generated the click, and with a publisher site, $P_k$, that hosted the resource that was clicked (e.g., a webpage feature such as an advertisement provided by a third-party). Let $S_c$ represent the IPA size associated with $IP_c$, and let n represent the number of clicks on the resource hosted by $P_k$ during a certain time period, T.

With reference to a single publisher, $P_k$, IPA sizes $S_1, \ldots, S_n$ are modeled as the realizations of a sample of n random variables. $S_1, \ldots, S_n$ can take a finite number of positive values $B_1 < B_2 < \ldots < B_m$, where $B_1=1$ is the minimum number of legitimate users sharing an IP address, and $B_m$ is the largest IPA size observed in a training period. The probability distribution associated with $\{S_c\}$, is defined by some (unknown) values $p_1, \ldots, p_m$, where $p_i = \mathbb{P}[S_c = B_i] \forall c$.

In general and when dealing with multiple publishers, these values depend on the respective publisher itself, i.e., $p_i = p_i(P_k)$.

In an embodiment, $\tilde{f}_i$ is defined as the observed frequency of IPA sizes associated with $B_i$, i.e., the count of clicks that have size $B_i$: $\tilde{f}_i = \#\{S_c: S_c = B_i\}$, and $f_i$ is defined as the relative number of clicks of size $B_i$, i.e., $f_i = \tilde{f}_i/n$. As the number of observed clicks increases, $f_i$ approaches $p_i$ as quantified by the Central Limit Theorem, $$\frac{f_i - p_i}{\frac{p_i}{\sqrt{n}}} \to_{n \to \infty} N(0.1 - p_i).$$

This enables an approximation for the unknown value $p_i$ with measurable quantities, $f_i$, and derive formal confidence bounds. Moreover, an estimate may be obtained of the true (unknown) probability distribution: $p_i = r_i, \forall i$.

Click Filtering

Figure 5A:
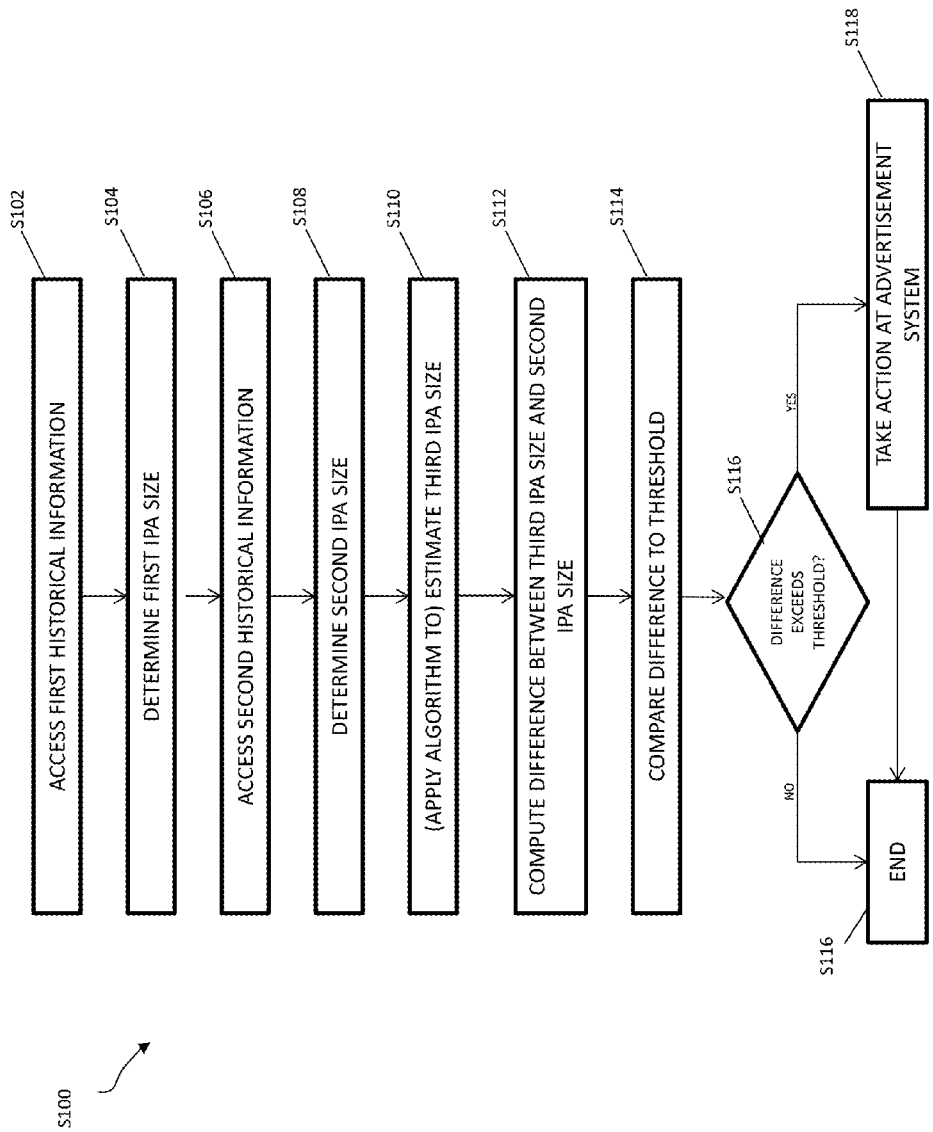
FIGS. 5A-5B are flow charts illustrating example steps associated with determining fraudulent click traffic, in accordance with an embodiment.
Figure 5B:
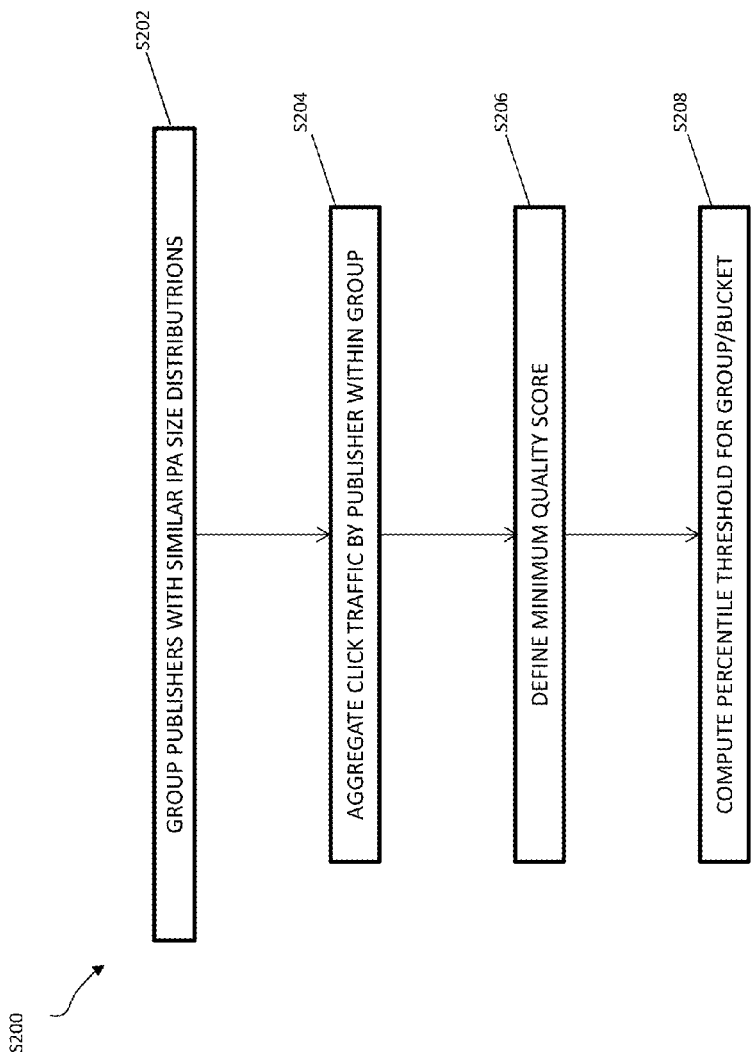

In many cases, traffic received by a publisher's web site includes a mixture of both legitimate and fraudulent clicks, as illustrated in FIG. 1. Embodiments disclosed herein are operable to detect and filter out the fraudulent clicks. FIGS. 5A-5B are flow charts illustrating example steps associated with determining fraudulent click traffic.

Turning now to FIG. 5A, a flow diagram is described showing a routine S100 that illustrates a broad aspect of a method for detecting machine-generated traffic in accordance with at least one embodiment disclosed herein. It should be appreciated that several of the logical operations described herein are implemented (1) as a sequence of computer implemented acts or program modules running on a communication device and/or (2) as interconnected machine logic circuits or circuit modules within a communication device. The implementation is a matter of choice dependent on the requirements of the device (e.g., size, energy, consumption, performance, etc.). Accordingly, the logical operations described herein are referred to variously as operations, structural devices, acts, or modules. Various of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The process begins at step S102 in which first historical information associated with Internet traffic to an Internet service that occurred at a first time is accessed by at least one processor. As a non-limiting example, the traffic may include clicks on a publisher's website concerning various resources being provided by the publisher, such as in response to an advertisement or an electronic poll concerning local or government issues, political candidates, and so on. Based on at least the first historical information, a first IPA size is determined (step S104). The first IPA size represents a first number of computing devices sharing at least one IP address, and that accessed the Internet service at the first time. At step S106, second historical information associated with Internet traffic to the Internet service that occurred at a second time is accessed by the processor(s). Based on at least the second historical information, a second IPA size is determined (step S108). The second IPA size represents a second number of computing devices sharing at least one IP address that accessed the Internet service at the second time.

Continuing with reference to FIG. 5A, at step S110 a third IPA size is estimated by the at least one processor. The third IPA size may be estimated by applying an algorithm that uses the first IPA size (step S104) as well as a third number of computing devices sharing at least one IP address that accessed the Internet service at the second time. The third number of computing devices may be estimated based upon the number of computing devices that accessed the Internet service at the first time. At step S112, a difference between the third IPA size and the second IPA size is determined by the at least one processor. The difference is compared to a threshold (step S114). At step S116, a determination is made whether the difference exceeds a threshold and, if so, the process branches to step S118 and an action is taken at a resource-provider system (including, without limitation, an advertisement system). Thereafter, the process ends at step S120. Alternatively, if the determination at step S116 is that the difference does not exceed the threshold, then the process branches to step S120, and the process ends.

FIG. 5B identifies example steps S200 associated with defining a threshold for legitimate click traffic in accordance with an embodiment. At step S202, publishers having similar IPA size distributions are grouped together. In an embodiment, an IPA size distribution may be estimated based on the type of services provided by the respective publishers. Moreover, the IPA size distribution may be estimated based on the type of traffic driven to the publishers' services. Another factor that may influence an IPA size distribution includes the geo-location of the source IP addresses accessing a publisher's service. Different countries have different IPA size distributions due to various reasons, such as heavy use of proxy devices, population density versus number of IP addresses available, and government policies. Thus, geo-location information also impacts IPA size distributions. Accordingly, publishers that provide the same type of service (e.g., web search, services for mobile users, content sites, parked domain websites or the like), that receive clicks from the same or similar type of connecting device (e.g., desktops, smart-phones, and tablets), and that receive traffic from IP addresses assigned to the same country, are grouped together. In case, for example, a publisher receives clicks from more than one type of device, that publisher's traffic may be split depending on the type of devices, and accordingly assigned to different groups. This provides for a fine-grained grouping of publishers, which takes into account the various factors that affect the IPA size.

Continuing with reference to the implementation represented in the flowchart shown in FIG. 5B, click traffic received by any publisher within a single group is aggregated over a time period T (step S204). Moreover and in an embodiment, click traffic that is received by each respective publisher may be "binned" using a function of the actual IPA size. Thereafter, a minimum quality score, $q_{min}$, is defined that represents a set of legitimate clicks that an Internet service should receive (step S206). Different websites may have different minimum quality scores, for example depending on various factors, such as the services provided and the resources displayed. Thus, the quality score $q_{min}$ may be determined as a fixed fraction of the average quality score associated with each group of publishers.

In an embodiment, live click traffic received by each publisher is partitioned into separate "buckets," depending on the IPA size value. Continuing with reference to the implementation represented in the flowchart shown in FIG. 5B, for each group and/or each bucket, a percentile threshold, t, is determined (step S208). In case, for example, any publisher receives more than t % of that publisher's traffic in connection with that publisher's bucket, that traffic may get filtered, substantially in real time. In an implementation, a fine-grain scan of possible percentiles for a respective bucket is conducted to set t. Moreover, a percentile threshold for each group may be determined. For example, for each percentile, p, the traffic from all the publishers that received more than p % of traffic from that bucket is aggregated, with some binomial confidence threshold. If the quality score of this aggregated traffic is lower than $q_{min}$, then p is defined as a candidate threshold. The threshold, t, may be selected as the candidate threshold that has the highest impact, i.e., the largest number of discarded traffic.

This technique takes into account the observed empirical distributions, the number of available samples (IPA sizes), and the desired confidence level. Filtered clicks represent regions of high probability for specific publishers, and may be identified as spikes in the publisher's respective IPA size distributions that also have a significantly lower quality than would have otherwise been expected for the same group of publishers and set of resources being provided to user devices during that sample period.

Figure 6A:
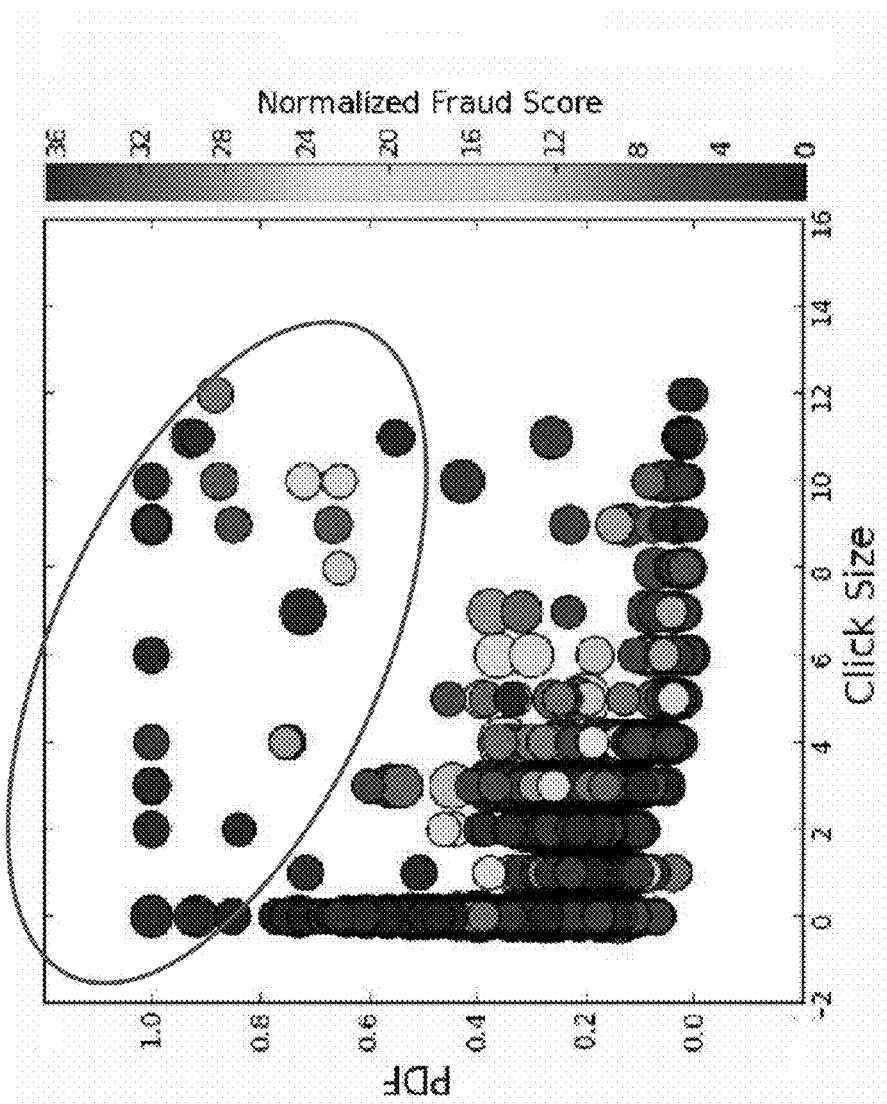
FIGS. 6A-6D are graphs that show example representations of two groups of publishers whose websites provide similar services.
Figure 6B:
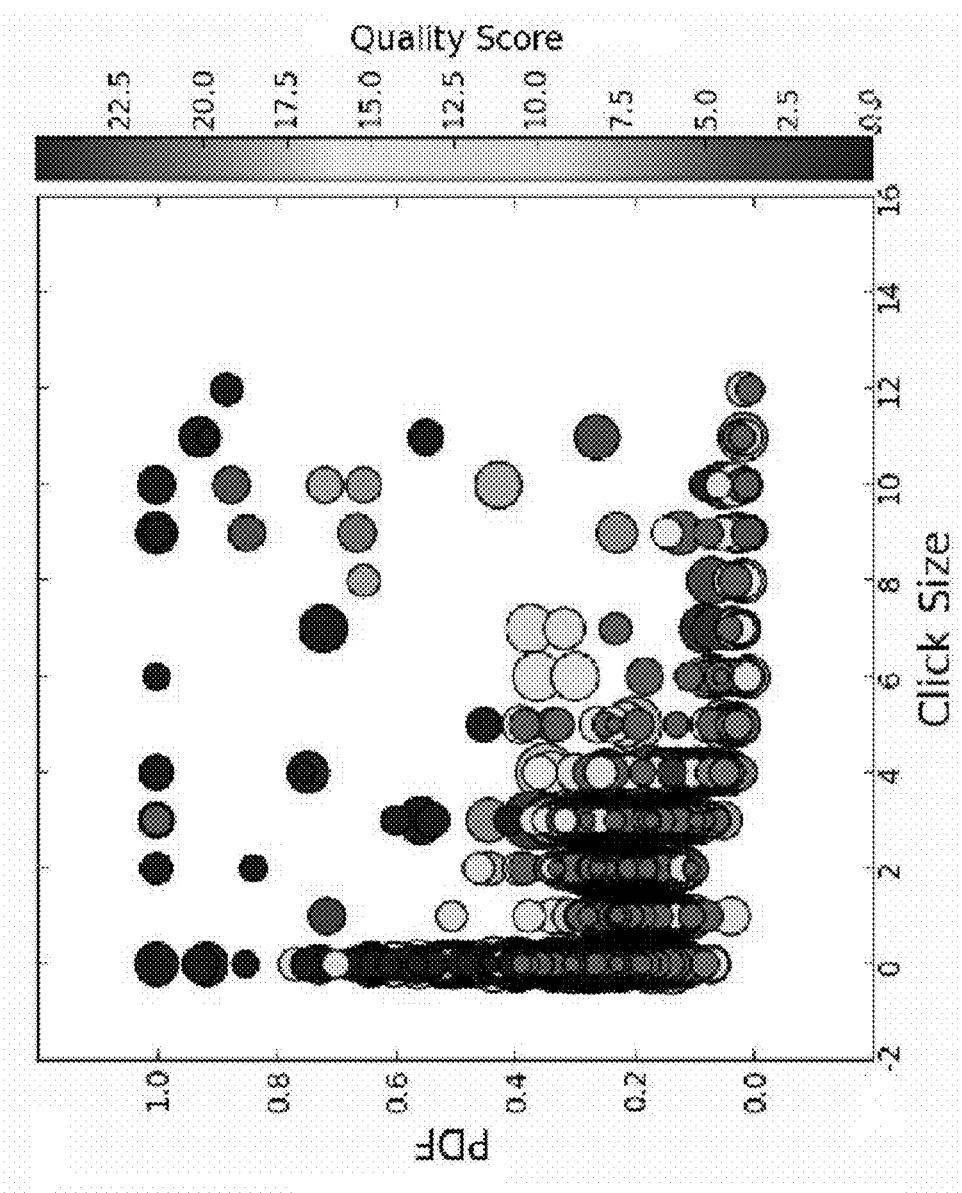
Figure 6C:
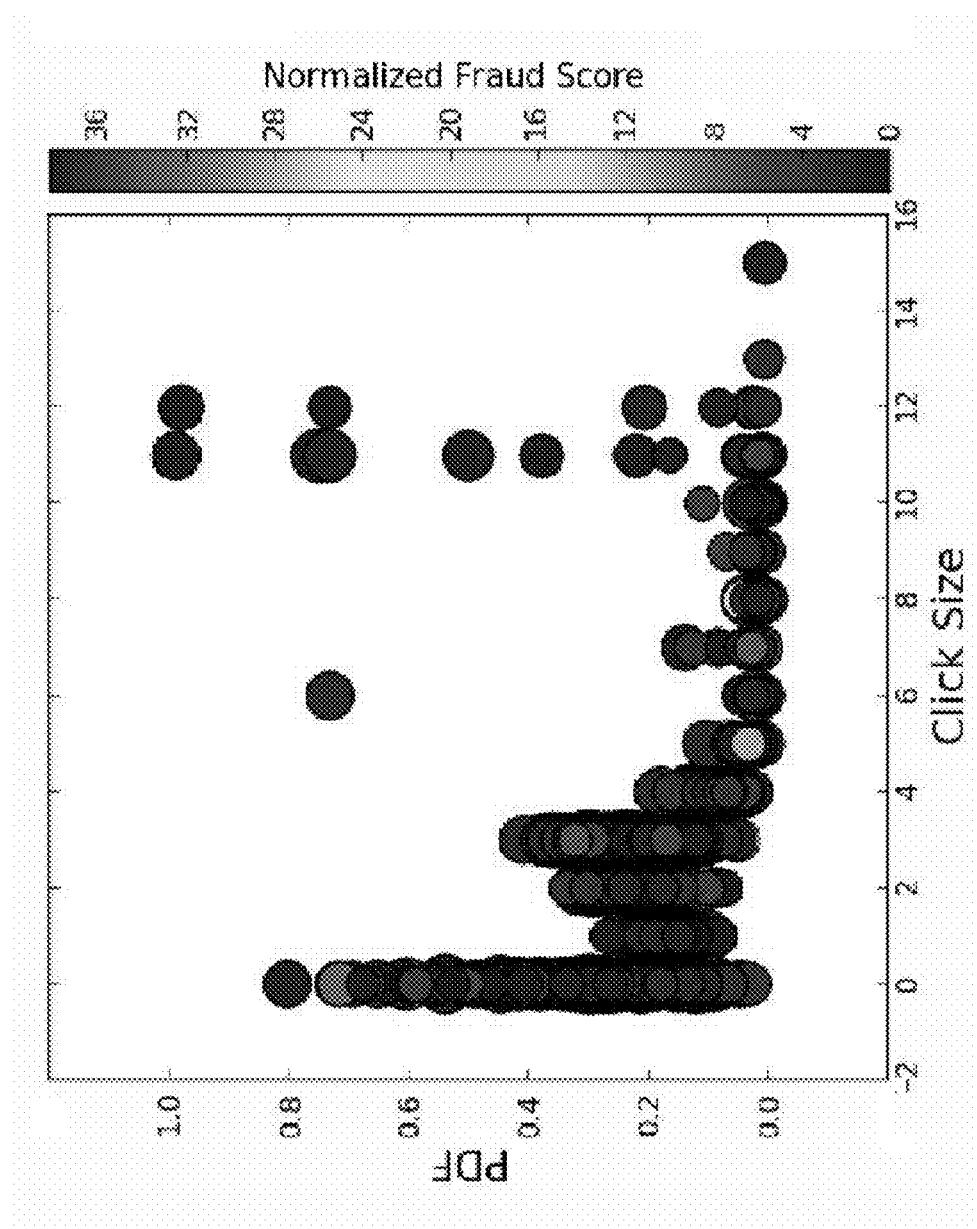
Figure 6D:
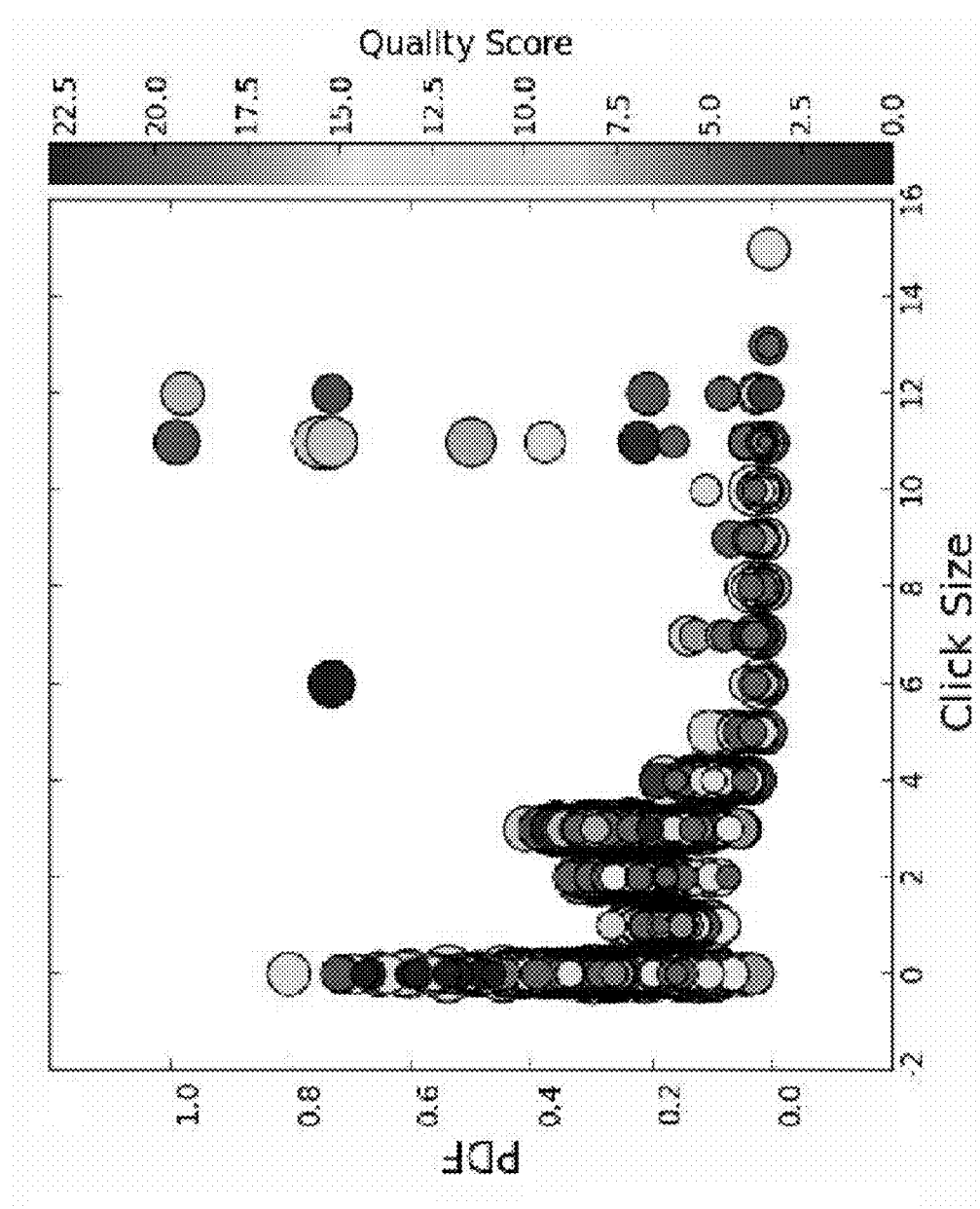

FIGS. 6A-6D are graphs that show example representations of two groups of publishers whose websites provide similar services and whose click traffic comes from the same country and the same type of device. FIGS. 6A and 69 represent one group of publishers, and FIGS. 6C and 6D represent the other group of publishers. Each figure is a four-dimensional plot. The x-axis represents the bucket of the IPA size, while the y-axis represents the probability value (which is referred to as values of a "PDF," i.e., a probability density function). Each point is associated with a single publisher and represents the probability that the publisher receives a click of a certain size. In FIGS. 6A and 6C, the size of data points represents the number of clicks and the shade represents the scaled fraud score. FIGS. 6B and 6D display the same points as in FIGS. 6A and 6C, with the difference that the size represents the number of clicks used to determine fraudulent traffic, and the shade represents the scaled quality score. The plotted circles with different sizes represent different levels of statistical confidence.

FIGS. 6A-6D represent a confirmation of the botnet-based and proxy-based attacks shown and described above in connection with FIGS. 4A and 4B. FIG. 6A and FIG. 6B show the results of one of the largest groups, comprising hundreds of publishers. Despite the complexity of the problem and the variety of possible attacks, FIG. 6A illustrates that spikes in the IPA size distribution of a publisher are reliable indicators of high fraud score. As an additional validation, referring to FIG. 6B, the corresponding quality score is analyzed. The spikes corresponding to high fraud score also have very low, or zero, quality score, which supports the conclusion that the identified clicks are indeed fraudulent.

FIG. 6C and FIG. 6D illustrate a sample group where the IPA size distribution detects machine-generated traffic that would have been undetected otherwise. For example, FIG. 6C shows the case of a publisher that has about 70% of its clicks in bucket 6. This spike in distribution is particularly suspicious since all other publishers in the same group have 15% or fewer click of this size. The quality score associated with this point supports this conclusion. Despite the large number of clicks (size in FIG. 6D), a very low quality score is identified. Similarly, a small group of publishers have most of clicks in buckets 11 or 12. Also in this case, the known fraud score is low, but so is the quality score, which hints of previously undetected attacks, possibly orchestrated by a group of colluding publishers.

Analysis of a Single Bucket

Figure 7:
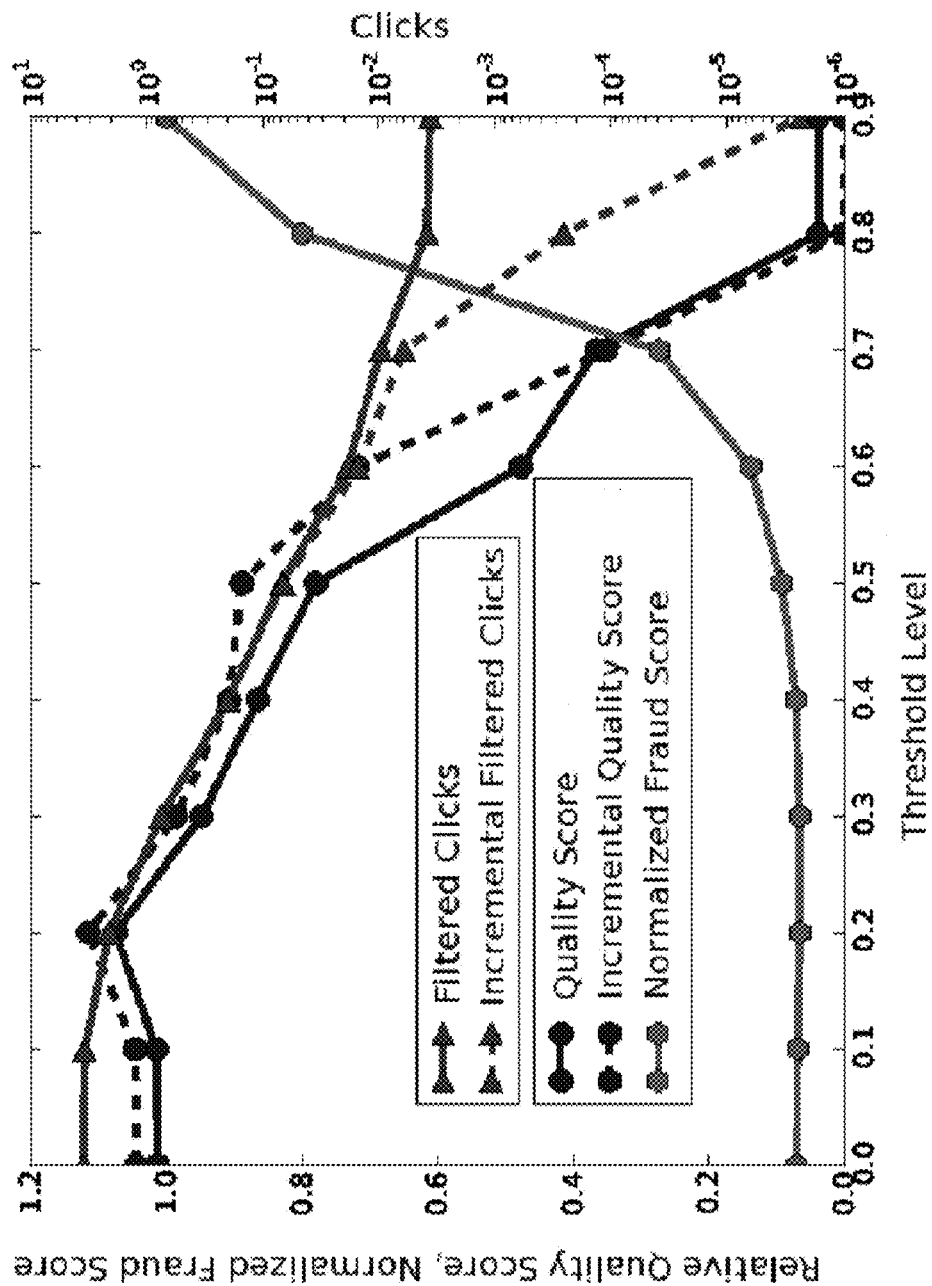
FIG. 7 is a graph that identifies traffic associated with a single bucket having a large number of data points.

FIG. 7 is a graph that identifies traffic associated with a single bucket having a large number of data points. The graph in FIG. 7 identifies the number of filtered clicks, the fraud score, and the quality score and how they vary with the percentile threshold set by the histogram filter for this bucket. Moreover, the number of incremental fraudulent clicks, i.e., the number of fraudulent clicks detected solely by the IPA size histogram filter and not by other systems, as well as the incremental quality score, i.e., the quality score associated with the incremental fraudulent clicks, can be determined. As shown in FIG. 7, a small fraction of clicks, about 1% of the total number of clicks in this bucket, is identified near threshold level 0.7 that have both a high fraud score and a low quality score.

Figure 8:
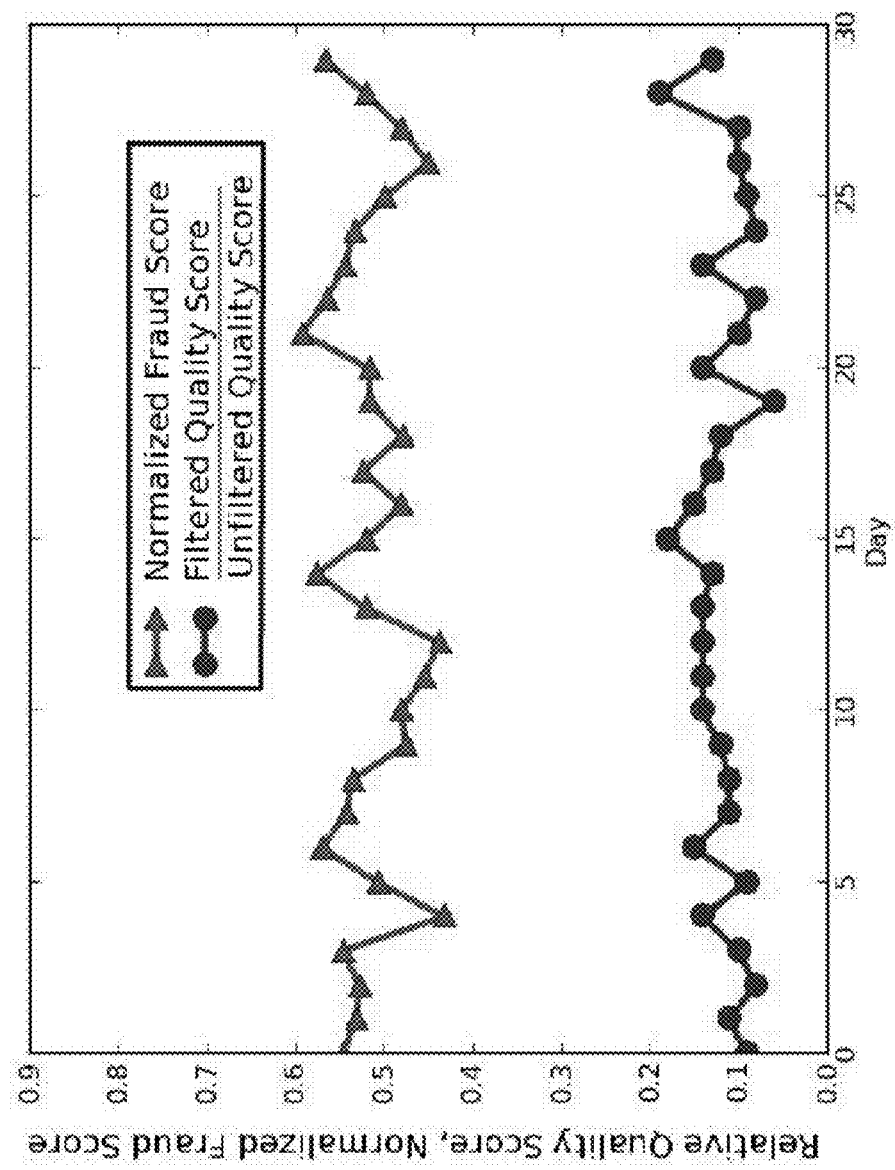
FIG. 8 is a graph that illustrates performance over time and, in particular, a fraud score and quality score for different days.

FIG. 8 is a graph that illustrates performance over time and, in particular, a fraud score and quality score for different days. FIG. 8 illustrates how an implementation of an embodiment of the invention performs over time. For example, the IPA size histogram detection is run every day for a month, and the fraud score and quality score of the filtered click traffic is computed. As represented in FIG. 8, the fraud score is consistently high and stable over time, while the quality score of the filtered traffic remains an order of magnitude lower than the quality score of the unfiltered traffic for the same group of publishers.

Figure 9:
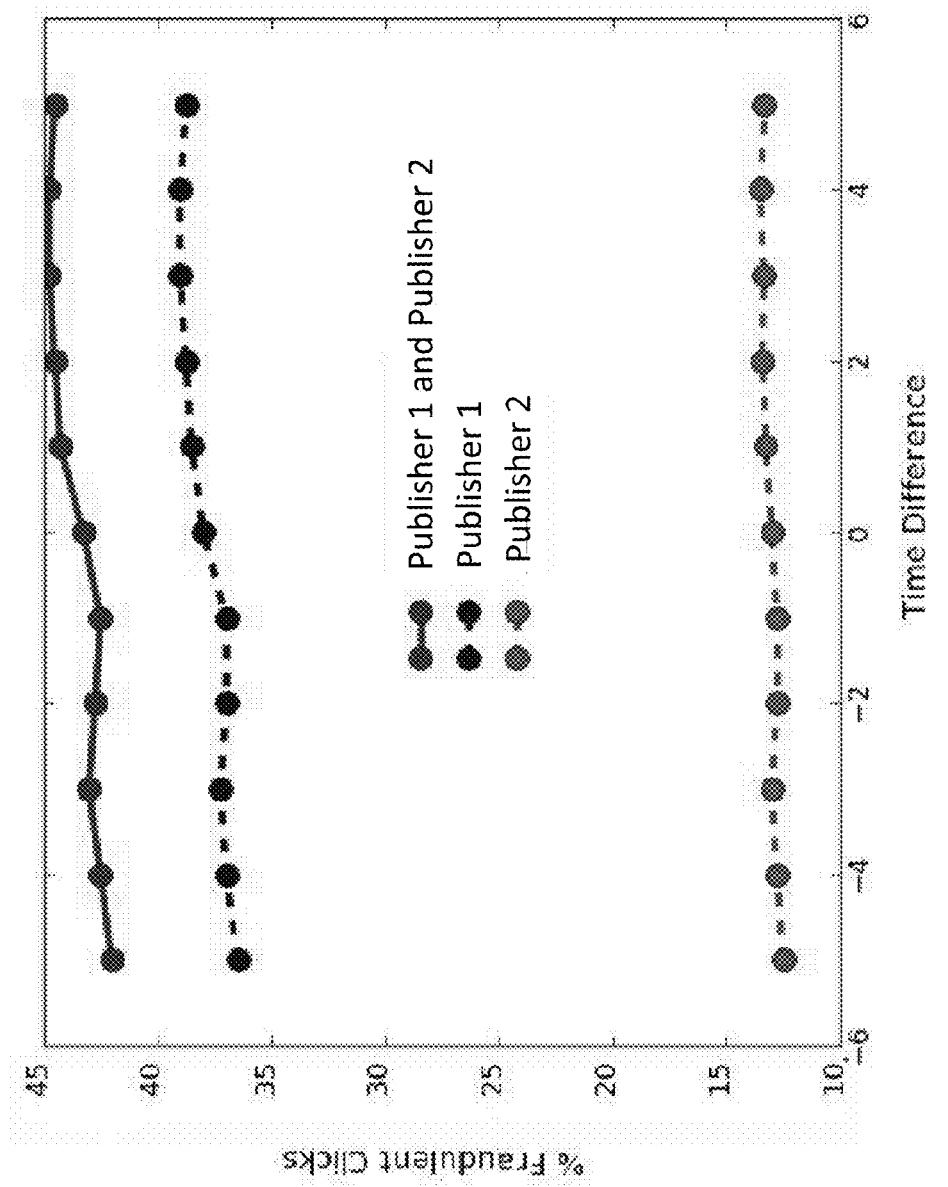
FIG. 9 is a graph that illustrates computing devices that generate more than one type of fraudulent clicks.

Moreover, it is believed by the inventors that a large percentage of fraudulent clicks is generated by computing devices that also generate other kinds of abusive traffic, such as spam emails. See, for example, FIG. 9.

Figure 10:
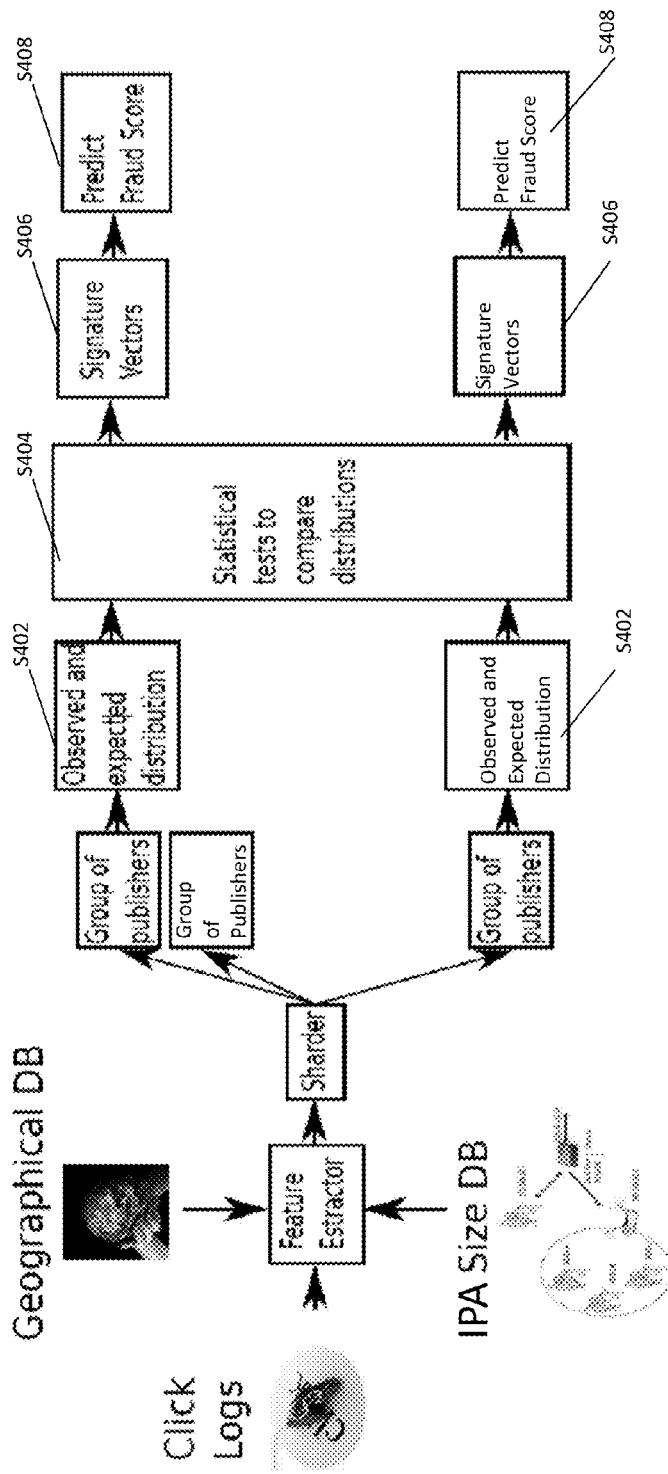
FIG. 10 is a flowchart that illustrates an example workflow in accordance with an implementation.

FIG. 10 is a flowchart that illustrates an example workflow in accordance with an implementation. At step S402, an estimation of expected IPA size distribution for each of a plurality of entities is performed, such as set forth in arrangement 200 (FIG. 2). Each group may have a different IPA size distribution. Entities within the same group are expected to share a similar distribution. Since the majority of fraudulent clicks are already filtered out, such as described herein, an aggregate distribution of legitimate IPA sizes within each group is used as an estimation of an accurate (unknown) IPA size distribution for a particular group. At step S404, a set of statistical methods is used to accurately characterize the deviation between the observed and expected distribution. As noted above and with reference to FIGS. 4A and 4B, different attacks result in different deviations in the IPA size distribution. Moreover, an ensemble learning model may be used to combine the method outcome in a signature vector (step S406) specific to each entity, and a regression model is trained that identifies and classifies signatures associated with fraudulent entities and a fraud score is predicted (step S408).

In order to accurately characterize the deviation, if any, between the observed and the expected distribution of each entity, an ensemble of different statistical methods may be used. The methods may be grouped in four categories: vector-based methods; skewness-based methods; entropy based methods; and goodness-of-fit tests. Vector-based methods may include the $L_p$ distance, the cosine similarity, and the Pearson correlation coefficient. These methods may measure either the geometrical or the angular distance between two distributions. Entropy based methods may include the Jensen-Shannon and the Kullback-Leibler divergence. These methods measure how concentrated or spread apart values realized by the given distributions may be. Skewness-based methods may include computing a sample skewness, and the Bowley skewness, as well as other domain-specific metrics. These methods may measure both the direction (left-skew vs. right-skew), as well as the magnitude of the asymmetry exhibited by the given distributions. Further, goodness-of-fit tests may include, for example, the Kolmogorov-Smirnov and the Chi-square test statistic. These methods estimate the likelihood that the observed IPA sizes are generated by the expected distribution.

In general, different methods for comparing probability distributions provide different information, as they measure different properties. For example, if the skewness of a distribution is measured, symmetric distributions may be considered similar to each other as they have null skewness. However, if other properties, such as, the $L_2$ distance, are measured, two symmetric distributions may, generally, be different from each other. Using an ensemble of statistical methods may provide a more accurate characterization of the observed deviation than using just a single method. This may be particularly significant for analyzing massive data sets, comprising a wide range of different patterns.

In order to precisely measure the observed deviation and identify fraudulent entities, the outcome of statistical methods, such as described above, are combined in a signature vector, $\sigma_k$, specific to each entity, $P_k$. Intuitively, significant deviations from the expected distribution, measured by several statistical methods, represent strong indicators of fraudulent click traffic. For this reason, the fraud score, $\varnothing_k$, may be modeled as a linear function of the observed deviations, $$\phi_k = \sum_{j=1}^{p} \theta_j \sigma_{kj}$$

Equation 1 where, $\sigma_{kj}$ indicates the j-th component of $\sigma_k$ and $\theta_j$ is the weight associated with it. We determine the optimal set of weights, $\theta$, in Equation 1 that minimize the least-square cost function, $$J(\theta) = \sum_{k \in K} \left( \bar{\phi}_k - \sum_{j=1}^{p} \theta_j \sigma_{kj} \right)^2$$

using a stochastic gradient descent method trained on a small subset of entities, K, which includes legitimate distributions and known attacks provided both by other automated systems, and by manual investigation of the logs. The model in Equation 1 is then applied to a large data set of entities to predict the fraud score as a function of their IPA size distribution.

Performance Results

Figure 11:
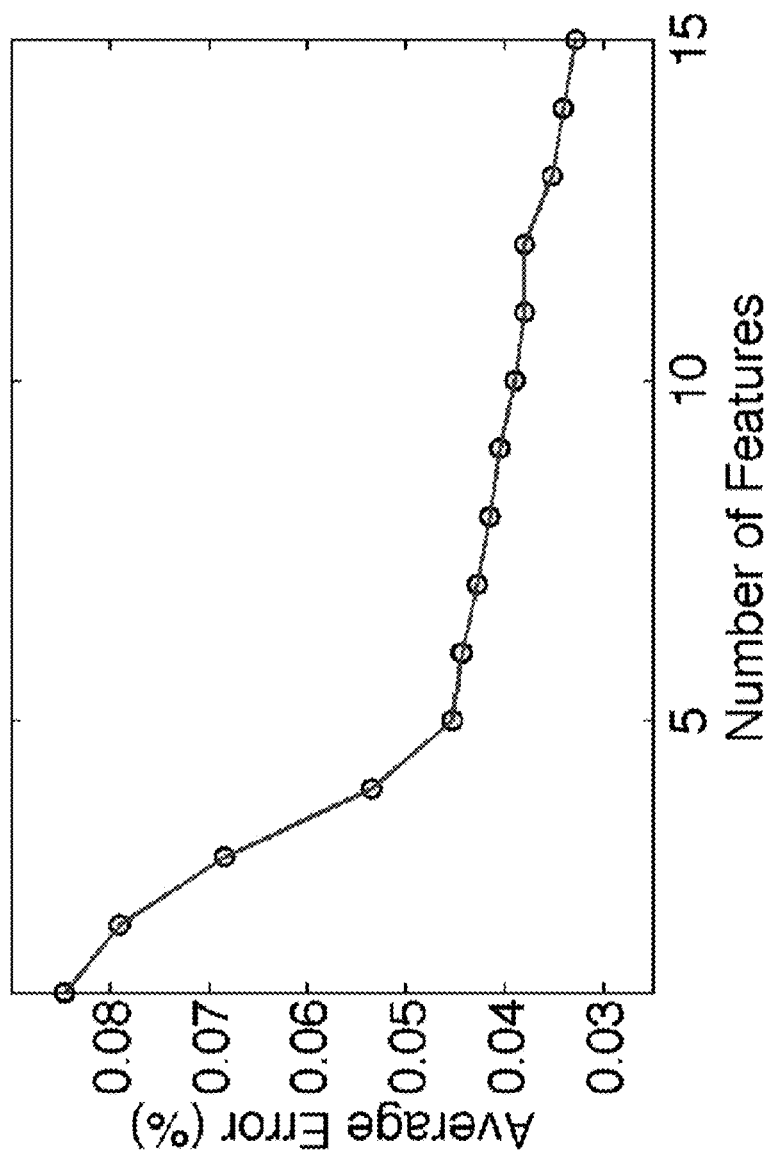
FIG. 11 is a graph that illustrates accuracy in predicting the fraud score.

FIG. 11 is a graph that illustrates the accuracy of the model in Equation 1 in predicting the fraud score as a function of the number of statistical methods used to compare distributions. At the outset, an analysis of the accuracy of the teachings herein is made when all methods are used. Each of a plurality features that causes the least amount of variation in the prediction accuracy is iteratively removed until a single feature remains. In an implementation, 10% of the entities are used for testing on the remaining entities. FIG. 11 shows that using multiple comparison methods that measure different type of deviations allows for a reduction of prediction errors, which may be significantly lower than when using a single method. Moreover, additional methods improve the accuracy of the model but with decreasing gain. FIG. 11 illustrates prediction accuracy: number of comparison methods vs. average error in predicting the fraud score.

To validate the goodness-of-fit of the model in Equation 1 the adjusted coefficient of determination, $\bar{R}^2$ is further determined:

$$\bar{R}^2 = 1 - \frac{n-1}{n-p} \frac{SS_{err}}{SS_{tot}}$$

where, $$SS_{err} = \sum_{k} (\bar{\phi}_k - \phi)^2$$

is the sum of squares of residuals.

Equation 2

Equation 2 can be interpreted as the amount of variance captured by proposed model. Moreover, in contrast with the $R^2$ statistic, which does not decrease with more regressors, $\bar{R}^2$ penalizes the use of a large number of regressors unless it significantly improves the explanatory power of the model.

Figure 12:
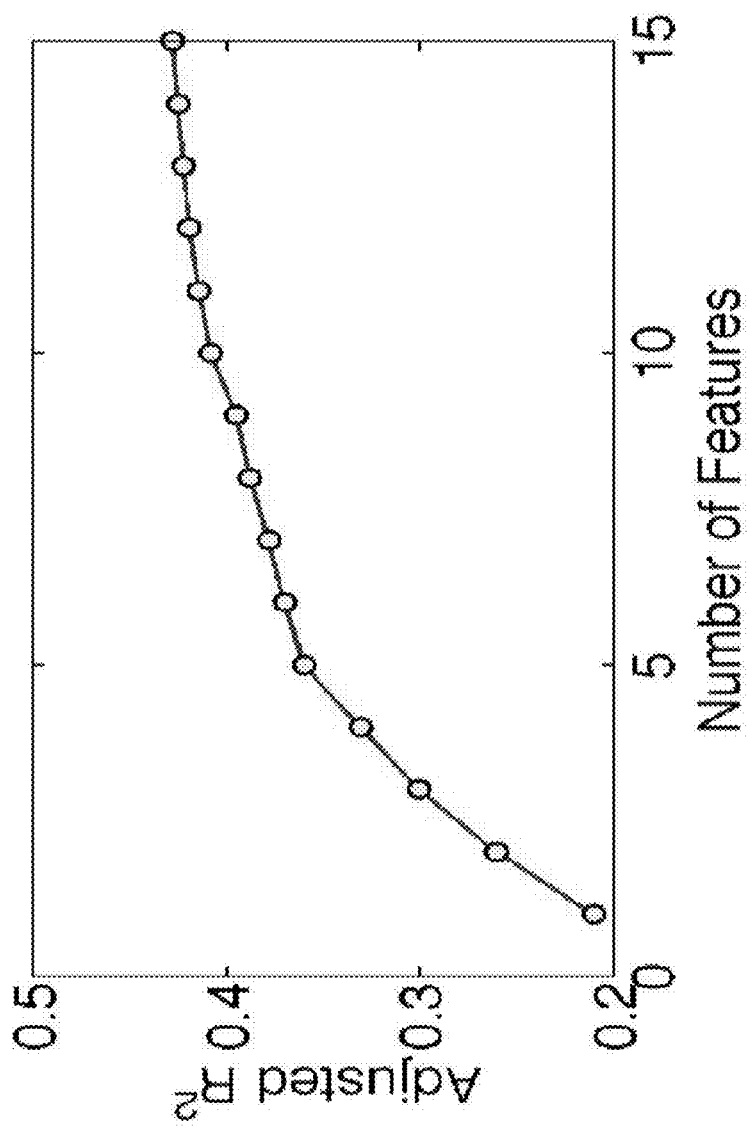
FIG. 12 is a graph that also illustrates the prediction accuracy.

FIG. 12 is a graph that illustrates the prediction accuracy as a function of the number of comparison methods vs. $R^2$. As the number of features increases, the adjusted coefficient of determination, $R^2$, increases as well, and so does the explained variance. When all features are used, the model in Equation 1 captures over 40% of the total variation in the data. This result is particularly significant in a large data set that includes a wide range of patterns of click traffic.

A discussion regarding strengths of this approach beyond those metrics is now provided.

The teachings herein do not require any identification or authentication of the users generating the clicks. It only uses aggregate statistical information about the IPA size. The anonymity is preserved. Moreover, in an implementation the process is fully automated, has low complexity (it scales linearly in the amount of data to be processed), and is easy to parallelize. This makes it suitable for large-scale detection. Further, the IPA size is robust to DCHP reassignment. Clicks generated from a specific host have the same size regardless the specific IP address assigned. This is particularly useful in practice, since a large fraction of IP addresses are dynamically reassigned every 1-3 days [23]. Still further, the IPA size-based detection is hard to evade. Even if an attacker knows the legitimate distribution of IPA sizes for all publishers in a respective group as well as the exact mechanisms used to estimate the IPA size, the attacker would still need to generate clicks according to the legitimate IPA size distribution. However, the attacker has access only to a limited number of bots. Further, even for those bats, the attacker cannot control the activities of legitimate users sharing the compromised machines. This in turn affects the IPA size and limits her ability to arbitrarily shape the IPA size distribution.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 13:
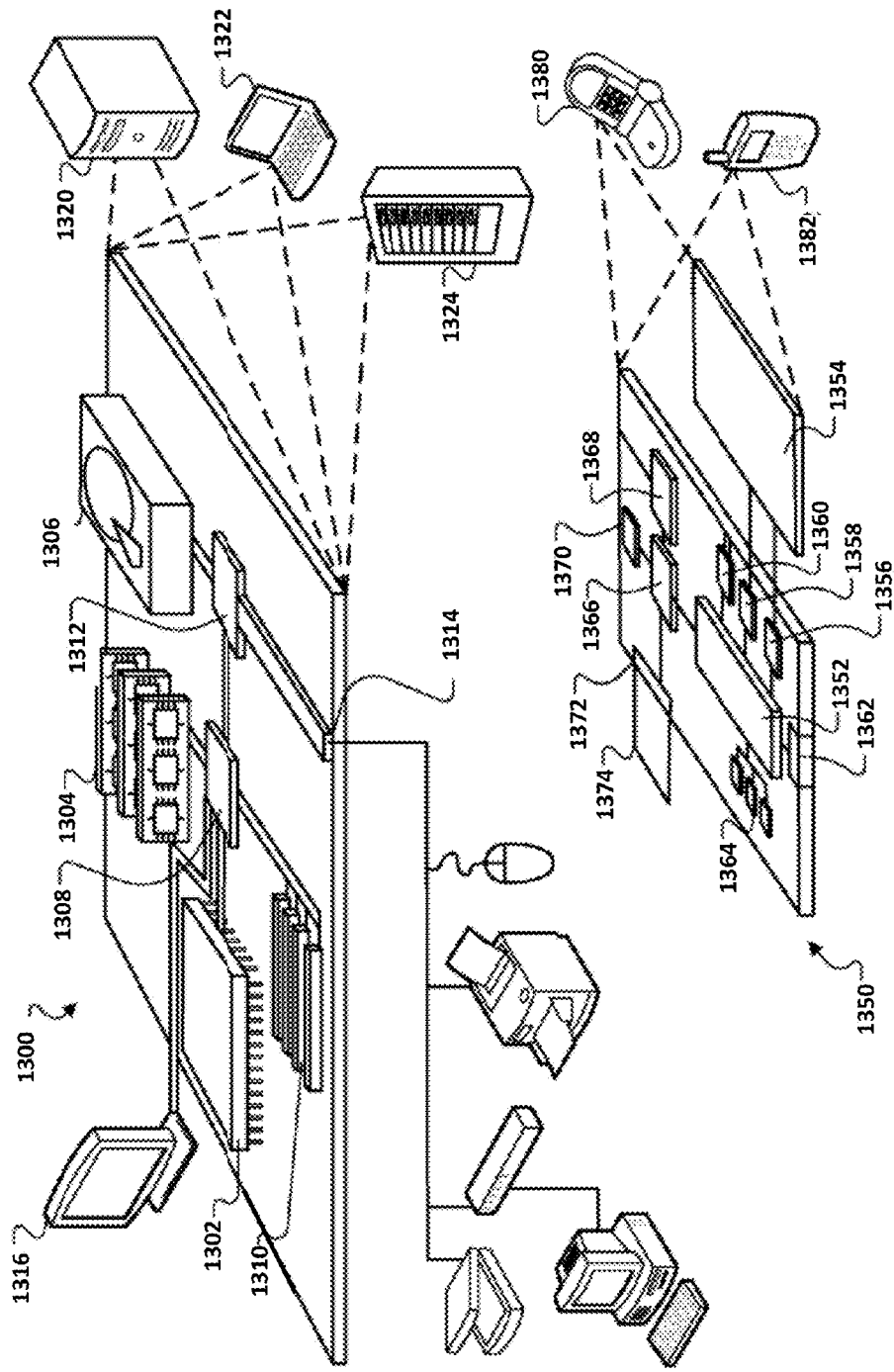
FIG. 13 shows an example of a computing device and a mobile computing device that can be used to implement the techniques described herein.

FIG. 13 shows an example of a computing device 1300 and a mobile computing device that can be used to implement the techniques described herein the present specification. The computing device 1300 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1300 includes a processor 1302, a memory 1304, a storage device 1306, a high-speed interface 1308 connecting to the memory 1304 and multiple high-speed expansion ports 1310, and a low-speed interface 1312 connecting to a low-speed expansion port 1314 and the storage device 1306. Each of the processor 1302, the memory 1304, the storage device 1306, the high-speed interface 1308, the high-speed expansion ports 1310, and the low-speed interface 1312, are interconnected using various busses, and can be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as a display 1316 coupled to the high-speed interface 1308. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1304 stores information within the computing device 1300. In some implementations, the memory 1304 is a volatile memory unit or units. In some implementations, the memory 1304 is a non-volatile memory unit or units. The memory 1304 can also be another form of computer-readable medium, such as a magnetic or optical disk.

The storage device 1306 is capable of providing mass storage for the computing device 1300. In some implementations, the storage device 1306 can be or contain a computer-readable medium, e.g., a computer-readable storage medium such as a floppy disk device, a hard disk device, an optical disk device, or a tape device, a flash memory or other similar solid state memory device, or an array of devices, including devices in a storage area network or other configurations. A, computer program product can also be tangibly embodied in an information carrier. The computer program product can also contain instructions that, when executed, perform one or more methods, such as those described above. The computer program product can also be tangibly embodied in a computer- or machine-readable medium, such as the memory 1304, the storage device 1306, or memory on the processor 1302.

The high-speed interface 1308 manages bandwidth-intensive operations for the computing device 1300, while the low-speed interface 1312 manages lower bandwidth-intensive operations. Such allocation of functions is exemplary only. In some implementations, the high-speed interface 1308 is coupled to the memory 1304, the display 1316 (e.g., through a graphics processor or accelerator), and to the high-speed expansion ports 1310, which can accept various expansion cards (not shown). In the implementation, the low-speed interface 1312 is coupled to the storage device 1306 and the low-speed expansion port 1314. The low-speed expansion port 1314, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1300 can be implemented in a number of different forms, as shown in the figure. For example, it can be implemented as a standard server 1320, or multiple times in a group of such servers. In addition, it can be implemented in a personal computer such as a laptop computer 1322. It can also be implemented as part of a rack server system 1324. Alternatively, components from the computing device 1300 can be combined with other components in a mobile device (not shown), such as a mobile computing device 1350. Each of such devices can contain one or more of the computing device 1300 and the mobile computing device 1350, and an entire system can be made up of multiple computing devices communicating with each other.

The mobile computing device 1350 includes a processor 1352, a memory 1364, an input/output device such as a display 1354, a communication interface 1366, and a transceiver 1368, among other components. The mobile computing device 1350 can also be provided with a storage device, such as a micro-drive or other device, to provide additional storage. Each of the processor 1352, the memory 1364, the display 1354, the communication interface 1366, and the transceiver 1368, are interconnected using various buses, and several of the components can be mounted on a common motherboard or in other manners as appropriate.

The processor 1352 can execute instructions within the mobile computing device 1350, including instructions stored in the memory 1364. The processor 1352 can be implemented as a chipset of chips that include separate and multiple analog and digital processors. The processor 1352 can provide, for example, for coordination of the other components of the mobile computing device 1350, such as control of user interfaces, applications run by the mobile computing device 1350, and wireless communication by the mobile computing device 1350.

The processor 1352 can communicate with a user through a control interface 1358 and a display interface 1356 coupled to the display 1354. The display 1354 can be, for example, a TFT (Thin-Film-Transistor Liquid Crystal Display) display or an OLED (Organic Light Emitting Diode) display, or other appropriate display technology. The display interface 1356 can comprise appropriate circuitry for driving the display 1354 to present graphical and other information to a user. The control interface 1358 can receive commands from a user and convert them for submission to the processor 1352. In addition, an external interface 1362 can provide communication with the processor 1352, so as to enable near area communication of the mobile computing device 1350 with other devices. The external interface 1362 can provide, for example, for wired communication in some implementations, or for wireless communication in other implementations, and multiple interfaces can also be used.

The memory 1364 stores information within the mobile computing device 1350. The memory 1364 can be implemented as one or more of a computer-readable medium or media, a volatile memory unit or units, or a non-volatile memory unit or units. An expansion memory 1374 can also be provided and connected to the mobile computing device 1350 through an expansion interface 1372, which can include, for example, a SIMM (Single In Line Memory Module) card interface. The expansion memory 1374 can provide extra storage space for the mobile computing device 1350, or can also store applications or other information for the mobile computing device 1350. Specifically, the expansion memory 1374 can include instructions to carry out or supplement the processes described above, and can include secure information also. Thus, for example, the expansion memory 1374 can be provided as a security module for the mobile computing device 1350, and can be programmed with instructions that permit secure use of the mobile computing device 1350. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1364, the expansion memory 1374, or memory on the processor 1352. In some implementations, the computer program product can be received in a propagated signal, for example, over the transceiver 1368 or the external interface 1362.

The mobile computing device 1350 can communicate wirelessly through the communication interface 1366, which can include digital signal processing circuitry where necessary. The communication interface 1366 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1368 using a radio-frequency. In addition, short-range communication can occur, such as using a Bluetooth, WiFi, or other such transceiver (not shown). In addition, a GPS (Global Positioning System) receiver module 1370 can provide additional navigation- and location-related wireless data to the mobile computing device 1350, which can be used as appropriate by applications running on the mobile computing device 1350.

The mobile computing device 1350 can also communicate audibly using an audio codec 1360, which can receive spoken information from a user and convert it to usable digital information. The audio codec 1360 can likewise generate audible sound for a user, such as through a speaker, e.g., in a handset of the mobile computing device 1350. Such sound can include sound from voice telephone calls, can include recorded sound (e.g., voice messages, music files, etc.) and can also include sound generated by applications operating on the mobile computing device 1350.

The mobile computing device 1350 can be implemented in a number of different forms, as shown in the figure. For example, it can be implemented as a cellular telephone 1380. It can also be implemented as part of a smart-phone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method for affecting action associated with machine-generated traffic, the method comprising:
    accessing, by at least one processor, first historical information associated with Internet traffic to an Internet service that occurred at a first time;
    determining, based on at least the first historical information and utilizing the at least one processor, a first Internet Protocol Address ("IPA") size representing a first number of computing devices sharing at least one IP address that accessed the Internet service at the first time;
    accessing, by the at least one processor, second historical information associated with Internet traffic to the Internet service that occurred at a second time;
    determining, based on at least the second historical information and utilizing the at least one processor, a second IPA size representing a second number of computing devices sharing at least one IP address that accessed the Internet service at the second time;
    applying, by the at least one processor, an algorithm that uses the first IPA size to estimate a third IPA size representing a third number of computing devices sharing at least one IP address that accessed the Internet service at the second time;
    computing a difference between the third IPA size and the second IPA size and evaluating the difference to a threshold that is indicative of the machine-generated traffic; and
    taking an action at a resource-provider system when the difference exceeds the threshold.

2. The method of claim 1, wherein the difference that exceeds the threshold represents at least one of botnet-based attacks and proxy-based attacks.

3. The method of claim 1, wherein estimating the third IPA size further includes estimating the third number of computing devices based on the first historical information.

4. The method of claim 1, further comprising applying, by the at least one processor, another algorithm to compute the threshold by:
    identifying, by the at least one processor, a group of a plurality of publishers with similar IPA size distributions;
    aggregating, by the at least one processor, traffic received by each respective publisher within the group;
    defining, by the at least one processor, a minimum quality score; and
    evaluating, by the at least one processor, the percentage of traffic received by the group of publishers with the minimum quality score.

5. The method of claim 1, wherein computing the difference further includes measuring at least one anomalous deviation by one or more of a vector-based method, a skewness-based method, an entropy-based method and a goodness-of-fit test.

6. The method of claim 1, further comprising filtering out fraudulent traffic from legitimate traffic based on an IPA size histogram.

7. The method of claim 1, wherein determining the first IPA size and/or the second IPA size is based on at least identifying a rate of activity and a diversity of traffic.

8. The method of claim 1, further comprising measuring, by the at least one processor, an IPA size distribution that represents an empirical distribution of IPA sizes associated with advertisements on a website during a time period.

9. The method of claim 1, wherein the action relates to at least one of pricing, bidding and filtering.

10. A system comprising: one or more processors configured to interact with a computer readable medium in order to perform operations comprising:
    accessing, by at least one processor, first historical information associated with Internet traffic to an Internet service that occurred at a first time;
    determining, based on at least the first historical information, a first Internet Protocol Address ("IPA") size representing a first number of computing devices sharing at least one IP address that accessed the Internet service at the first time;
    accessing, by the at least one processor, second historical information associated with Internet traffic to the Internet service that occurred at a second time;
    determining, based on at least the second historical, a second IPA size representing a second number of computing devices sharing at least one IP address that accessed the Internet service at the second time;
    applying, by the at least one processor, an algorithm that uses the first IPA size to estimate a third IPA size representing a third number of computing devices sharing at least one IP address that accessed the Internet service at the second time;
    computing a difference between the third IPA size and the second IPA size and evaluating the difference to a threshold that is indicative of machine-generated traffic; and
    taking an action at a resource-provider system when the difference exceeds the threshold.

11. The system of claim 10, wherein the difference that exceeds the threshold represents at least one of botnet-based attacks and proxy-based attacks.

12. The system of claim 10, wherein estimating the third IPA size further includes estimating the third number of computing devices.

13. The system of claim 10, wherein computing the difference includes measuring at least one anomalous deviation by one or more of a vector-based method, a skewness-based method, an entropy-based method and a goodness-of-fit test.

14. The system of claim 10, wherein the one or more processors are further configured to interact with a computer readable medium in order to perform operations to compute the threshold by:
 identifying a group of a plurality of publishers with similar IPA size distributions;
 aggregating traffic received by each respective publisher within the group;
 defining a minimum quality score; and
 evaluating the percentage of traffic received by the group of publishers with the minimum quality score.

15. The system of claim 10, wherein the one or more processors are further configured to interact with a computer readable medium in order to perform operations comprising filtering out fraudulent traffic from legitimate traffic.

16. The system of claim 15, wherein filtering out the fraudulent traffic from the legitimate traffic is based on an IPA size histogram.

17. The system of claim 10, wherein determining the first IPA size and/or the second IPA size is based on at least identifying a rate of activity and a diversity of traffic.

18. The system of claim 10, wherein the one or more processors are further configured to interact with a computer readable medium in order to perform operations comprising measuring an IPA size distribution that represents an empirical distribution of IPA sizes associated with advertisements on a website during a time period.

19. The system of claim 10, wherein the action relates to at least one of pricing, bidding and filtering.

20. A computer storage medium encoded with a computer program, the program comprising instructions that when executed by one or more data processing apparatus cause the one or more data processing apparatus to perform operations for affecting action in response to a determination of machine-generated traffic based upon a first Internet Protocol Address ("IPA") size representing a first number of computing devices sharing at least one IP address that accessed an Internet service at a first time, and a second IPA size representing a number of computing devices sharing at least one IP address that accessed the Internet service at a second time, the operations comprising:
 applying, by the at least one processor, an algorithm that uses the first IPA size to estimate a third IPA size representing a third number of computing devices sharing at least one IP address that accessed the Internet service at the second time;
 computing a difference between the third IPA size and the second IPA size and evaluating the difference to a threshold that is indicative of the machine-generated traffic; and
 taking an action at a resource-provider system when the difference exceeds the threshold.

* * * * *